(12) United States Patent
Kondo

(10) Patent No.: US 6,644,275 B2
(45) Date of Patent: Nov. 11, 2003

(54) APPARATUS FOR CONTROLLING ENGINE

(75) Inventor: Wakichi Kondo, Kariya (JP)

(73) Assignee: Denso Corporation, Kariya (JP)

( * ) Notice: Subject to any disclaimer, the term of this patent is extended or adjusted under 35 U.S.C. 154(b) by 37 days.

(21) Appl. No.: 10/093,730

(22) Filed: Mar. 11, 2002

(65) Prior Publication Data

US 2002/0124831 A1 Sep. 12, 2002

(30) Foreign Application Priority Data

Mar. 12, 2001  (JP) ........................................ 2001-069206

(51) Int. Cl.$^7$ ............................. F02D 43/04; F02B 17/00
(52) U.S. Cl. ................... 123/406.47; 123/295; 123/399; 123/406.45; 123/406.48; 123/480
(58) Field of Search .................................. 123/295, 305, 123/399, 406.45, 406.47, 406.48, 478, 480, 568.14, 568.21

(56) References Cited

U.S. PATENT DOCUMENTS

| | | | | |
|---|---|---|---|---|
| 5,778,856 A | * | 7/1998 | Okada et al. ............ | 123/480 X |
| 5,970,947 A | * | 10/1999 | Iida et al. .................... | 123/295 |
| 6,497,212 B2 | * | 12/2002 | Matsumoto et al. ........ | 123/295 |
| 6,502,546 B2 | * | 1/2003 | Kawasaki et al. .......... | 123/399 |

FOREIGN PATENT DOCUMENTS

| | | |
|---|---|---|
| JP | 4-36042 | 2/1992 |
| JP | 6-108824 | 4/1994 |

\* cited by examiner

*Primary Examiner*—Tony M. Argenbright
(74) *Attorney, Agent, or Firm*—Nixon & Vanderhye P.C.

(57) ABSTRACT

An apparatus for controlling an engine responds to the switching of combustion mode from stoichiometric combustion to lean-fuel combustion to vary the target throttle opening in step-wise fashion, causing the quantity of intake air to increase in a fashion of first-order delay. The base fuel injection quantity and base ignition timing are computed based on the response of intake air quantity. Consequently, the torque shock can be reduced and the quick combustion mode switching can be performed. Based on the quick passage of the air-fuel ratio zone in which a large amount of NOx arises, the amount of NOx emission can be reduced.

14 Claims, 21 Drawing Sheets

M

TATG

QA

QARESP

TAU

ESA

NE (TORQUE)

FIG. 26A M

FIG. 26B TATG

FIG. 26C QA

FIG. 26D VTT

FIG. 26E VTA

FIG. 26F QARESP

FIG. 26G EGRESP

FIG. 26H TAU

FIG. 26I ESABSE

FIG. 26J ESATRD

FIG. 26K ESA

FIG. 26L NE (TORQUE)

EMBODIMENT t1 t2 t3 TIME

FIG. 27A  M
FIG. 27B  TATG
FIG. 27C  QA
FIG. 27D  VTT
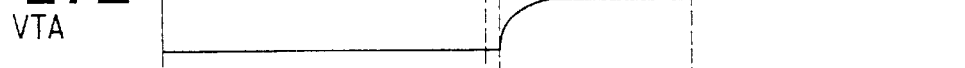
FIG. 27E  VTA
FIG. 27F  QARESP
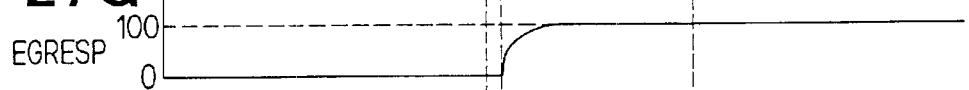
FIG. 27G  EGRESP
FIG. 27H  TAU
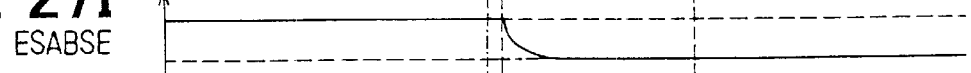
FIG. 27I  ESABSE
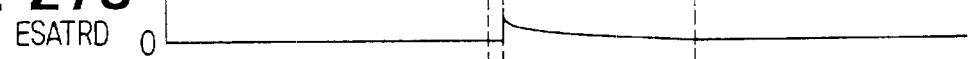
FIG. 27J  ESATRD
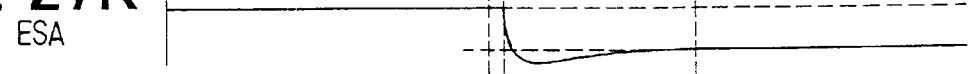
FIG. 27K  ESA
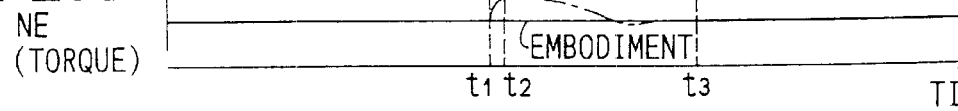
FIG. 27L  NE (TORQUE)

APPARATUS FOR CONTROLLING ENGINE

CROSS REFERENCE TO RELATED APPLICATION

This application is based on Japanese Patent Application No. 2001-69206 filed on Mar. 12, 2001 the contents of which are incorporated herein by reference.

BACKGROUND OF THE INVENTION

1. Field of the Invention

The present invention relates to an apparatus for controlling an engine, which is capable of switching the fuel combustion mode among the lean-fuel, stoichiometric, and rich-fuel combustion.

2. Description of Related Art

There have been proposed internal combustion engines which are controlled to have air-fuel ratios leaner than the stoichiometric ratio. These internal combustion engines have their fuel combustion mode controlled to switch among lean-fuel combustion, stoichiometric combustion and rich-fuel combustion depending on the operational state including the load condition.

Internal combustion engines vary the output torque abruptly at the switching of combustion mode due to the variation of air-fuel ratio or ignition timing, producing a large torque shock.

In this respect, a technique for alleviating the torque shock at the switching of combustion mode is described in JP-A No. H04-036042. The technique described in this patent publication is designed to vary the air-fuel ratio and ignition timing gradually at the switching of combustion mode, thereby alleviating the torque shock. Another technique described in JP-A No. H06-108824 is designed to control the retardation of ignition timing at the switching from lean-fuel combustion to rich-fuel combustion, thereby alleviating the torque shock.

Internal combustion engines which are controlled to perform lean-fuel combustion are intended to achieve the better fuel efficiency, and it is demanded to improve the fuel efficiency to the largest extent on condition that the toxic emission and drivability are not aggravated.

However, the technique described in JP-A No. H04-036042 causes the transitional time of combustion mode to extend, and a resulting longer duration of passage across the air-fuel ratio zone of the worst NOx emission will produce an increased amount of NOx.

The technique described in JP-A No. H06-108824 is based solely on the ignition retardation for the reduction of torque increase at the switching from lean-fuel combustion to rich-fuel combustion, and the need of a large ignition retardation will aggravate the state of combustion. The aggravate combustion involved in this technique will result in a degraded fuel efficiency.

SUMMARY OF THE INVENTION

In view of the foregoing prior art deficiencies, it is an object of the present invention to provide an apparatus for controlling an engine, which is capable of reducing the torque shock at the switching between rich-fuel combustion and stoichiometric or rich-fuel combustion, and also preventing the fall of fuel efficiency.

According to the present invention, a controller computes the response of intake air quantity based on the variation of opening of the throttle valve in the transition of combustion mode, and modifies the fuel injection quantity and ignition timing based on the intake air response.

When the combustion mode is switched, the intake air quantity, fuel injection quantity and ignition timing are changed to accord with the post-switching combustion mode. The time expended until the control value shifts to that for the post-switching combustion mode differs among the intake air quantity, fuel injection quantity and ignition timing. Among these control values, the intake air quantity is the slowest to reach the post-switching control value, and the controller implements a step-wise change of throttle valve opening to the post-switching opening value, thereby performing the quick switching of combustion mode. The controller modifies the fuel injection quantity and ignition timing based on the intake air response evaluated in the transition of combustion mode.

By reducing the torque shock without relying on a drastic ignition retardation control, the aggravation of combustion can be prevented. By changing the throttle valve opening in step-wise fashion to the post-switching opening value, it is possible to vary quickly the intake air quantity which is slower in response as compared with the ignition timing and fuel injection quantity. A resulting quick transition of combustion mode decreases the duration of passage across the air-fuel ratio zone of the worst NOx emission, and thus can reduce the toxic emission.

Furthermore, the modification of ignition timing and fuel injection quantity based on the intake air response evaluated in the transition of combustion mode does not necessitate drastic ignition retardation for the reduction of torque shock, and thus the aggravation of combustion can be prevented.

The response of intake air quantity may alternatively be computed based on the intake air quantities before and after the switching of combustion mode and the inferred immediate intake air quantity, in which case the fuel injection quantity and ignition timing can be modified more accurately.

The fuel injection quantity may be modified based on the variation of fuel injection quantities and intake air quantities before and after the switching of combustion mode. The ignition timing may be modified based on the variation of ignition timings and intake air quantities before and after the switching of combustion mode. In these cases, the fuel injection quantity or ignition timing can be set accurately at the switching of combustion mode.

The fuel injection quantity and ignition timing may be modified based on the response of exhaust gas recirculation (EGR) quantity.

Exhaust gas recirculation control mean is designed to set the control values depending on the combustion mode in the same manner as the intake air quantity, fuel injection quantity and ignition timing. When the exhaust gas recirculation control means introduces exhaust gas and intake air into the engine, fuel combustion is disturbed. Specifically, the fuel combustion is liable to be unstable at lean-fuel combustion, and the quantity of exhaust gas recirculation relative to the intake air quantity is reduced during the combustion at air-fuel ratios leaner than the stoichiometric ratio so as to prevent the disturbance of combustion.

When the combustion mode is switched, the proportion of exhaust gas recirculation relative to intake air can possibly increase due to the difference of response between the exhaust gas recirculation quantity and the intake air quantity during the mode transition, resulting possibly the arising of a torque shock. In this case, by modifying the fuel injection quantity and ignition timing based on the responses of exhaust gas recirculation quantity and intake air quantity, the torque shock can be reduced and the accurate combustion mode switching control can be performed.

At the switching of combustion mode, the target value of the exhaust gas recirculation quantity may be switched in step-wise fashion to the post-switching target value. Based on the step-wise switching of the exhaust gas recirculation quantity in addition to the intake air quantity, the mode transition takes place quickly, allowing the quick passage across the air-fuel ratio zone of the worst NOx emission during the transition, for example, from rich-fuel combustion to lean-fuel combustion, and vice versa, and consequently the toxic emission can be reduced.

Alternatively, the fuel injection quantity and ignition timing may be modified based on one of the fuel injection response and exhaust gas recirculation response so that the output torque increases during the transition of combustion mode, and in addition the amount of ignition timing retardation may be set based on the difference between the intake air response and the exhaust gas recirculation response. In consequence, the torque shock arising at the switching of combustion mode can be alleviated.

By modifying the base fuel injection quantity and base ignition timing, the fuel injection quantity and ignition timing may be set in accordance with one of the fuel injection response and ignition timing response during the mode transition.

The quantity of exhaust gas recirculation into the engine can be controlled based on either a variable valve timing device or an exhaust gas recirculation valve.

By modifying the fuel injection quantity and ignition timing based on whichever response that is faster among the intake air and exhaust gas recirculation, it is possible to control the engine always to the torque increase side at the switching of combustion mode. The ignition timing which has been modified based on the faster response may be rendered the modification of retardation based on the intake air response and exhaust gas recirculation response. In consequence, the switching of combustion mode can take place faster, and the torque shock at the transition can be alleviated.

By modifying the fuel injection quantity and ignition timing based on whichever response that is slower among the intake air and exhaust gas recirculation, it is possible to control the engine always to the torque increase side at the switching of combustion mode. The ignition timing which has been modified based on the slower response may be rendered the modification of retardation based on the intake air response and exhaust gas recirculation response. In consequence, the switching of combustion mode can take place faster, and the torque shock at the transition can be alleviated.

By modifying the fuel injection quantity and ignition timing based on whichever response that causes a torque increase among the exhaust gas recirculation and intake air, it is possible to control the engine always to the torque increase side at the switching of combustion mode. The modified ignition timing may be rendered the modification of retardation based on the difference of the exhaust gas recirculation response and the intake air response. In consequence, the torque shock at the transition of combustion mode can be alleviated.

At a mode switching from lean-fuel combustion to stoichiometric or rich-fuel combustion, the computation of fuel injection quantity and ignition timing may be implemented based on the exhaust gas recirculation response. In consequence, the torque shock caused by the difference of response between the exhaust gas recirculation and the intake air can be brought to the increase side. By the rendition of the modification of the ignition retardation to the modified ignition timing based on the difference of response between the exhaust gas recirculation and the intake air, it is possible to alleviate significantly the torque shock arising at the switching of combustion mode.

Similarly, at a mode switching from rich-fuel or stoichiometric combustion to lean-fuel combustion, the modification of the fuel injection quantity and ignition timing may be implemented based on the intake air response. In consequence, the torque shock caused by the difference of between the exhaust gas recirculation response and the intake air response can be brought to the increase side. By the rendition of the modification of ignition retardation to the modified ignition timing based on the difference of response between the exhaust gas recirculation and the intake air, it is possible to reduce significantly the torque shock arising at the switching of combustion mode.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

FIGS. 26A through 26L are timing charts showing the combustion mode switching control based on the second embodiment at the switching from rich-fuel combustion to stoichiometric or rich-fuel combustion;

FIGS. 27A through 27L are timing charts showing the combustion mode switching control based on the second embodiment at the switching from rich-fuel combustion to stoichiometric or rich-fuel combustion;

DESCRIPTION OF THE PREFERRED EMBODIMENTS

The embodiments of this invention will be explained with reference to the drawings.

First Embodiment

Figure 1:
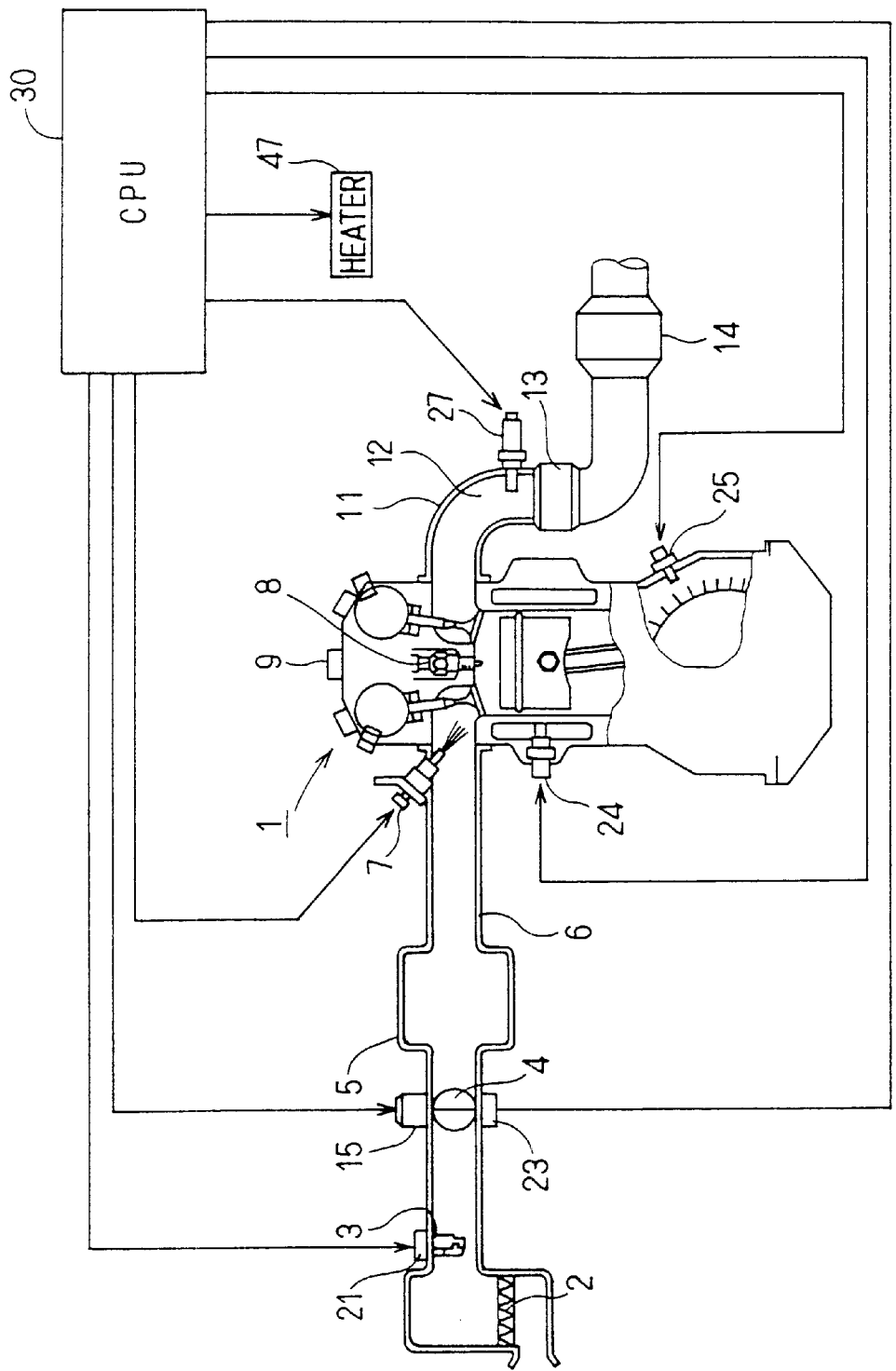
FIG. 1 is a schematic diagram showing a first embodiment of this invention.

FIG. 1 is a schematic diagram showing the air-fuel ratio control system based on the first embodiment of this invention. An internal combustion engine 1 shown in FIG. 1 is a 4-cylinder, 4-cycle spark ignition engine. Intake air from the outside flows through an air cleaner 2 into a suction pipe 3, goes through a surge tank 5 and intake manifold 3, and mixes in the intake manifold 3 with fuel which is injected by fuel injection valves 7 of the four cylinders. Resulting mixture of fuel and air having a prescribed mixture ratio is fed to the cylinders. The amount of air taken into the engine 1 is controlled by the variation of opening of a throttle valve 4. A throttle actuator 15 receives a command from a ECU 30 to move the throttle valve 4 so that it has an opening to admit a certain amount of intake air depending on the operational state of the engine 1.

An ignition plug 8 attached to each cylinder of the engine 1 produces a spark from a high voltage which is generated by an ignition coil 9, thereby igniting the mixture at a prescribed timing. Exhaust gas evacuated from each cylinder after combustion is conducted through an exhaust manifold 11 and exhaust pipe 12, further conducted through a 3-way catalytic converter 13 for detoxifying HC, CO and NOx in the exhaust gas and an NOx catalytic converter 14 for detoxifying NOx in the exhaust gas, and discharged into the atmosphere.

The NOx catalytic converter 14 absorbs NOx produced mainly by the combustion at lean air-fuel ratios, and releases the absorbed NOx (CO, HC, etc.) during the combustion at rich air-fuel ratios. The 3-way catalytic converter 13 is smaller in absorbing capacity than the NOx catalytic converter 14 and is activated immediately after the cold-start of the engine 1 to detoxify the exhaust gas. The 3-way catalytic converter 13 also has a function of storing oxygen, and it can detoxify HC and CO by using the stored oxygen when the air-fuel ratio deviates to some extent.

The suction pipe 3 is fitted out with an air flow meter 21 for detecting the intake air quantity. The throttle valve 4 is fitted up with a throttle sensor 23 for detecting the opening (throttle opening TH) of the valve 4, and it releases an analog signal indicative of the throttle opening TH. The throttle sensor 23 incorporates an idle switch, which releases a signal in response to a virtually full-open state of the throttle valve 4. The throttle valve 4 is moved by the throttle actuator 15, which is a usual d.c. motor or torque motor.

A coolant temperature sensor 24 is attached to the cylinder block of the engine 1, and it detects the temperature (coolant temperature Thw) of the coolant which circulates in the engine 1. An engine speed sensor 25 is attached to the crankcase of the engine 1, and it detects the rotational speed (engine speed Ne) of the engine 1.

The exhaust pipe 12 is fitted up, at the upstream position of the 3-way catalytic converter 13, with an air-fuel ratio sensor (A/F sensor) 27 of the critical current type, and it releases an air-fuel ratio signal which is proportional to and linear in a wide range of the oxygen concentration in the exhaust gas (or CO concentration in unburned gas) released from the engine 1. The A/F sensor 27 incorporates a heater 47 for activating the sensing element (solid catalyst and diffused resistance layer). The A/F sensor 27 can be a cup-type sensor having a sensing element of cup shape or a lamination-type sensor having laminated sheets of sensing element and heater 47.

The ECU 30 is a logical computation circuit including a usual CPU, ROM, RAM and backup RAM (all not shown), and it computes control values of the fuel injection quantity and ignition timing Ig based on the output signals of the above-mentioned sensors, and releases the respective outputs to the fuel injection valve 7 and ignition coil 9, respectively.

The ECU 30 implements duty-cycle control of the current conduction in the heater of the A/F sensor 27, thereby retaining the sensor 27 in the active state. Specifically, in this embodiment, the heater 47 of the A/F sensor 27 is supplied with electric power necessary to keep the temperature of the sensing element of the sensor 27 in the activation zone.

Although the engine 1 of this embodiment is of the type known as lean-burn engine in which the NOx catalytic converter 14 is located on the downstream side of the 3-way catalytic converter 13, the present invention is not confined to this type. Instead, for example, it can be a direct-injection engine using a swirl control valve or a direct-injection engine having its piston shaped to create a tumble stream.

Next, the operation of the air-fuel ratio control system arranged as described above will be explained in connection with FIG. 2 through FIG. 13.

Combustion Mode Computation Routine

The internal combustion engine based on this embodiment runs in different combustion modes depending on the operation zone. There are three combustion modes for example, which are stoichiometric combustion based on the theoretical air-fuel ratio, rich-fuel combustion based on a lean air-fuel ratio, and rich-fuel combustion based on a rich air-fuel ratio. These three combustion modes are switched in a sense of optimal control depending on the operational condition and operation zone.

Figure 2:
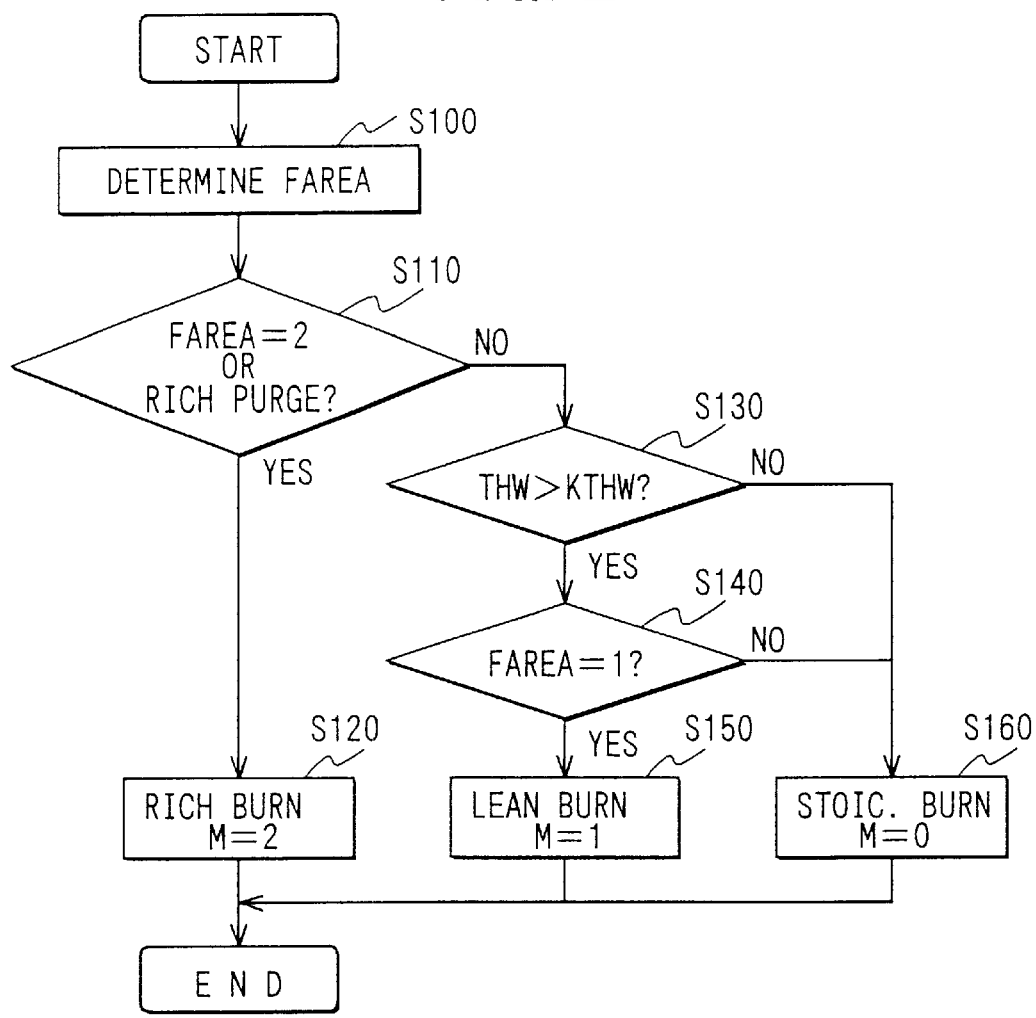
FIG. 2 is a flowchart showing the setting of target throttle opening value.

The program routine shown by flowchart in FIG. 2 is initiated at every 180° CA (crank angle) in the case of a 4-cylinder, 4-cycle engine. This routine implements the computation of the combustion mode which accords with a particular operational condition and operation zone.

Figure 3:
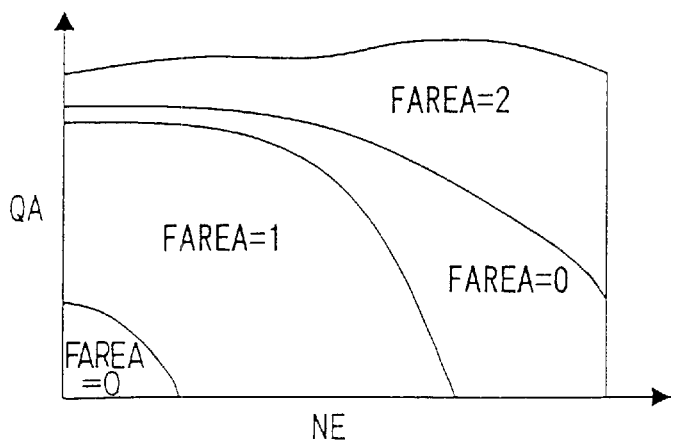
FIG. 3 is a diagram of the map for the setting of combustion mode for each operation zone.

Step S100 sets a value of flag FAREA of the operation zone based on the map of intake air quantity QA vs. engine speed NE as shown in FIG. 3. Specifically, when the engine speed NE and intake air quantity QA are both small, i.e., in the small-load operation such as during the idling of engine, the operation zone flag FAREA is set to be "0" indicative of the stoichiometric combustion zone. When the engine speed NE is high and the intake air quantity QA is medium, i.e., in the large-load operation, the operation zone flag FAREA is set to be "0" also. When the engine speed NE and intake air quantity QA are both medium, i.e., in the steady-state load operation, the operation zone flag FAREA is set to be "1" indicative of the lean-fuel combustion zone. When the engine speed NE and intake air quantity QA are both large, i.e., large-load operation, the operation zone flag FAREA is set to "2" indicative of rich-fuel combustion. Based on a resulting value of flag FAREA and the operational condition, the following process from step S110 determines the combustion mode.

The step S110 determines as to whether or not the operation zone flag FAREA is "2", or whether or not the rich purge for the reduction and discharge of NOx stored in the NOx catalyst is to take place. The FAREA flag of "2" indicates the large-load operation, and rich-fuel combustion at a rich air-fuel ratio takes place in this operation zone. Rich-fuel combustion also takes place for the rich purge of reducing and discharging NOx. If any of these two conditions is met, the sequence proceeds to step S120 to set the flag M to be "2" for implementing rich-fuel combustion, and the routine terminates.

Otherwise, if the operation zone flag FAREA is not "2" nor the condition of implementing the rich purge for reducing and discharging NOx stored in the NOx catalyst is not met, the sequence proceeds to step S130 to determine whether or not the engine coolant temperature THW detected by the coolant temperature sensor 24 is above a prescribed temperature KTHW. The engine having a coolant temperature above KTHW signifies that it has already warmed up, and in this case the sequence proceeds to step S140.

The step S140 sets the flag M to be "1" for implementing lean-fuel combustion for the better fuel efficiency in this steady-state load operation, and the routine terminates.

If the coolant temperature THW is KTHW or lower in step S130 or if the FAREA flag is not "1" in step S140, the sequence proceeds to step S160. With the FAREA flag being "0", step S160 sets the flag M to be "0" for implementing stoichiometric combustion at around the theoretical air-fuel ratio, and routine terminates.

Target Throttle Opening Computation Routine

Next, the computation process for the target throttle opening which accords with the established combustion mode will be explained.

Figure 4:
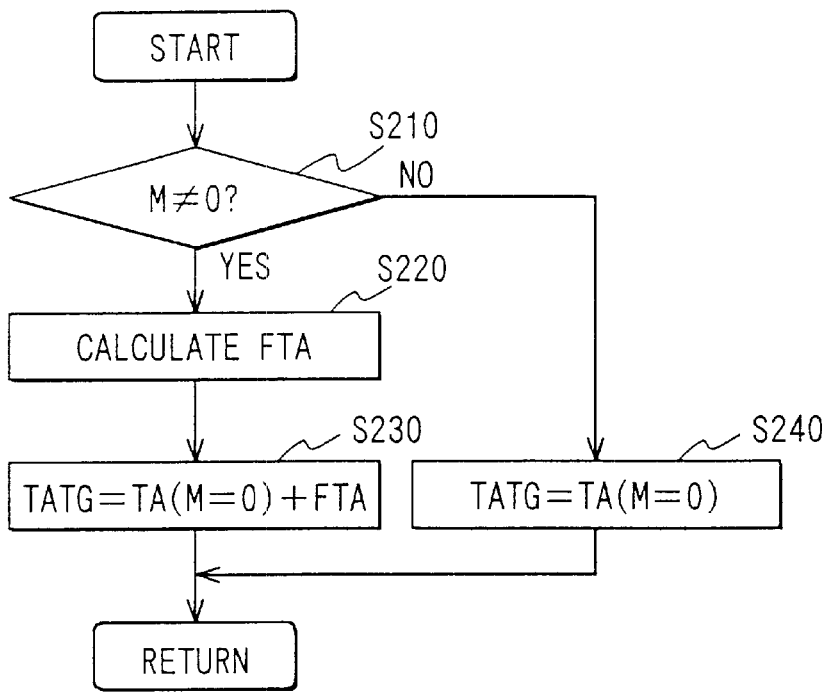
FIG. 4 is a flowchart showing the setting of target throttle opening.
Figure 5:
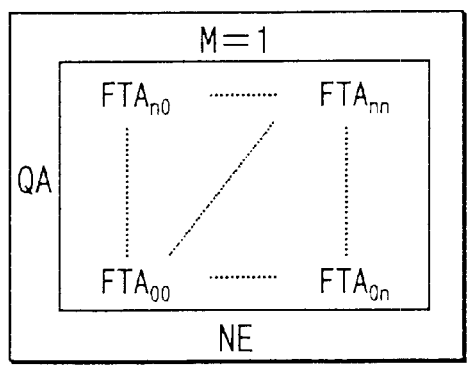
FIG. 5 is a diagram of the map of target throttle modification value for the rich combustion mode.
Figure 6:
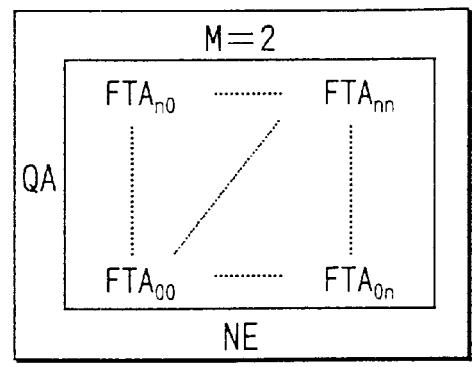
FIG. 6 is a diagram of the map of target throttle modification value for the lean combustion mode.

FIG. 4 shows by flowchart the computation of the target throttle opening. The first step S210 determines whether or not the combustion mode is other than stoichiometric combustion, i.e., whether or not the flag M of combustion mode is other than "0". If this condition is not met, i.e., if the flag M is "0", the sequence proceeds to step S240. The step S240 fetches a target throttle opening TATG from a map (not shown) which is a function of the engine speed NE and intake air quantity QA, sets the fetched value to the target throttle opening TATAG of stoichiometric combustion, and the routine terminates.

If the combustion mode is other than stoichiometric combustion in step S210, i.e., if the combustion mode flag M is other than "0", the following process of steps S220 and S230 sets a target throttle opening TATG which accords with the combustion mode. Specifically, the step S220 selects a map depending on the value of combustion mode flag M. This map evacuates a modification value FTA of the target throttle opening which accords with the engine speed NE and intake air quantity QA. The step S230 sets the target throttle opening TATG by adding the modification value FTA, which has been set in step S220 for the combustion mode, to the target throttle opening TA(M=0) of stoichiometric combustion.

The modification value FTA is computed for example as follows. If the combustion mode flag M is "1", i.e., if the combustion mode is lean-fuel combustion, the step S220 fetches a modification value FTA of the target throttle opening TATG from a map shown in FIG. 5 which is a function of the engine speed NE and intake air quantity QA. Similarly, if the combustion mode is rich-fuel combustion (M flag is "2"), the step S220 fetches a modification value FTA from another map shown in FIG. 6 in accordance with the engine speed NE and intake air quantity QA Following the setting of the target throttle opening TATG in this manner, the response of intake air quantity QA is computed as follows.

Intake Air Response Computation Routine

The response of intake air quantity QA signifies the responding of the intake air quantity to a target intake air quantity when the opening of throttle valve 4 is changed to a post-switching target value by stepping at the switching of combustion mode. The response computation routine will be explained in detail in connection with the flowchart of FIG. 7.

The first step S310 determines whether or not the combustion mode has changed by checking the equality of the combustion mode flag M to the previous flag value. On detecting a change of combustion mode from the previous mode, i.e., when the combustion mode is switched, the sequence proceeds to step S320. The step S320 sets the immediate intake air quantity QA to the previous intake air quantity QA(M(i−1)). Step S330 sets the intake air response QARESP to be 0, and the routine terminates. The process of these steps S320 and S330 is the initial setting process which takes place at each change of combustion mode.

Otherwise, if the combustion mode is not changed as determined by the step S310, the sequence proceeds to step S340. The step S340 determines whether or not the intake air response QARESP is 1.0. The intake air response QARESP becomes 1.0 when the transition of combustion mode has ended, and in this case the routine terminates. In case the QARESP is not 1.0, indicating that the combustion mode is in transition, the sequence proceeds to the process from step S350 for the computation of intake air response QARESP. This process is repeated until the QARESP becomes 1.0 for computing the response until the intake air quantity reaches the target intake air quantity QA following the change of combustion mode.

Figure 9:
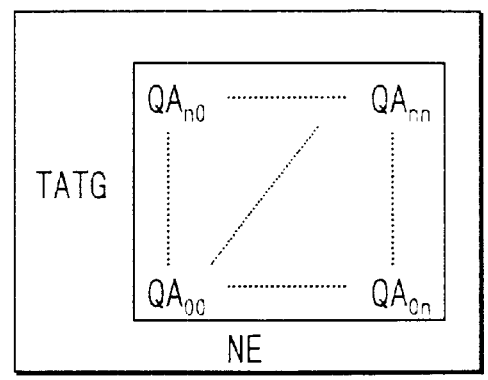
FIG. 9 is a diagram of the map for the setting of post-switching target throttle opening.

Step S350 computes the post-switching intake air quantity QA(M) based on a map shown in FIG. 9 in accordance with the target throttle opening TATG and engine speed NE, and the sequence proceeds to step S360. The step S360 computes the intake air response QARESP by the following formula.

$$QARESP=|QA-QA(M(i-1))|/|QA(M)-QA(M(i-1))|$$

The QA(M(i−1)) is the value which has been set in step S320 indicative of the intake air quantity before the change of combustion mode. The denominator of the formula computes the difference of the target intake air quantity QA(M) of the post-switching combustion mode from the previous QA(M(i−1)), and the numerator computes the difference of the immediate intake air quantity QA from the previous QA(M(i−1)). Accordingly, the formula computes the response QARESP of intake air quantity for the post-switching target throttle opening TATG. The immediate intake air quantity is inferred (by an intake air quantity inference means) based on the throttle opening provided by the throttle sensor 23 and engine speed NE.

The next step S370 determines whether or not the computed intake air response QARESP is close to 100%, specifically whether or not the response QARESP is greater than 0.95 for example. If this condition is not met, the response QARESP computed in step S360 is saved in the memory (not shown), and the routine terminates. Otherwise, if this condition is met, indicative of the arrival of the intake air quantity at the post-switching target intake air quantity, step S380 sets the response QARESP to be 1.0, and the routine terminates.

Fuel Injection Quantity Computation Routine

Next, the computation process of the fuel injection quantity which accords with the computed intake air response QARESP will be explained in connection with the flowchart of FIG. 8.

Figure 10A:
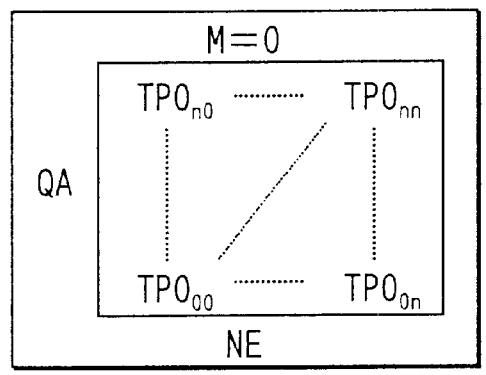
FIGS. 10A, 10B and 10C are diagrams of the maps used for the computation of base fuel injection quantities for individual combustion modes.
Figure 10B:
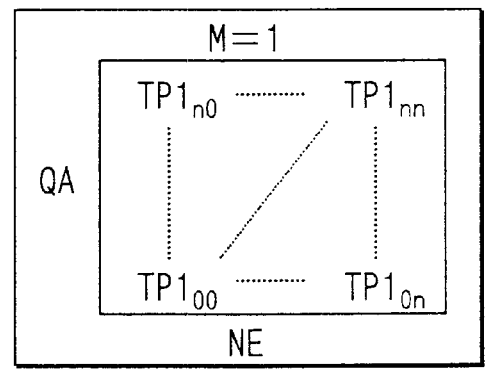
Figure 10C:
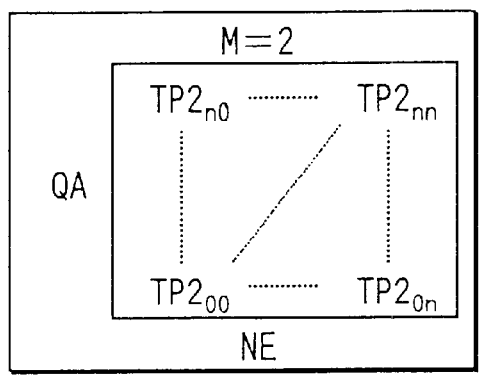

The first step S410 fetches a fuel injection quantity TP(M) from maps shown in FIGS. 10A, 10B and 10C, one of which is selected by the combustion mode flag M, in accordance with the engine speed NE and intake air quantity QA. The fuel injection quantity TP(M) is unique to each combustion mode indicated by the flag M, and there are three maps for the M flag of "0" shown by FIG. 10A, for the M flag of "1" shown by FIG. 10B, and for the M flag of "2" shown by FIG. 10C.

The next step S420 determines whether or not the intake air response QARESP is 1.0. If the QARESP is 1.0, the sequence proceeds to step S470 to set the base fuel injection quantity TP to be the fuel injection quantity TP(M) which has been computed depending on the combustion mode in step S410. Otherwise, if the QARESP is not 1.0, the sequence proceeds to step S430. The step S430 sets the air-fuel ratio modification factor FAF to be 1.0 in order to suspend the feedback control of air-fuel ratio. The feedback control of air-fuel ratio is to correct the air-fuel ratio based on its error from the target air-fuel ratio, and the conventional control system is used in this embodiment.

Step S440 determines whether or not the combustion mode has changed by checking the equality of the combustion mode flag M to the previous flag M(i−1). On detecting the equality of flag M to flag M(i−1), the sequence skips step S450 and proceeds to step S460. Otherwise, on detecting a change of flag M from flag M(i−1), the sequence proceeds to step S450 to set the base fuel injection quantity TP(M(i−1)) to be the base fuel injection quantity TP(M) of the previous combustion mode, and the sequence proceeds to step S460.

The step S460 computes the base fuel injection quantity TP during the transition of combustion mode by the following formula.

$$TP=TP(M(i-1))+QARESP \times (TP(M))-TP(M(i-1))$$

In the formula, the term TP(M)−TP(M(i−1)) represents the variation value of the base fuel injection quantity due to the switching of combustion mode. Multiplying the response QARESP to this variation value gives the modification value of base fuel injection quantity which accords with the intake air response during the transition of combustion mode.

Step S470 computes the fuel injection quantity TAU by the following formula.

$$TAU=TP \times FRICH \times FAX+FWET$$

In the formula, the term FRICH represents the modification factor for the state immediately after the engine start, and it is specifically a warming-up fuel increase factor for example. The term FWET is the transition modification factor for a transitional operation. These factors can have the conventionally known values.

Ignition Timing Computation Routine

Next, the computation process of the ignition timing ESA based on the intake air response QARESP which is derived from the computation shown by the flowchart of FIG. 7 will be explained in connection with the flowchart of FIG. 11.

Figure 12A:
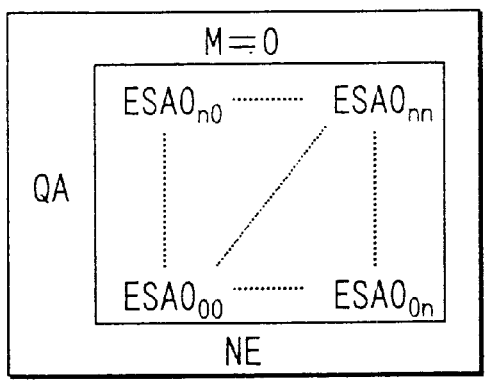
FIGS. 12A, 12B and 12C are diagrams of the maps used for the computation of base ignition timings for individual combustion modes.
Figure 12B:
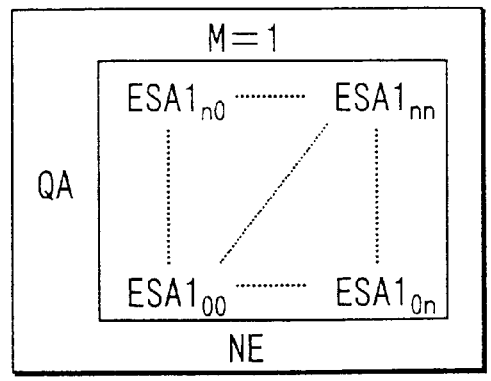
Figure 12C:
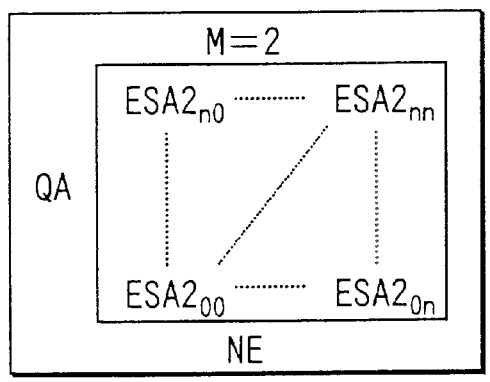

The first step S510 fetches an ignition timing ESA(M) from maps shown in FIGS. 12A, 12B and 12C, one of which is selected by the combustion mode flag M, in accordance with the engine speed NE and intake air quantity QA. The ignition timing ESA(M) is unique to each combustion mode. Shown by FIG. 12A is the map of base ignition timing for stoichiometric combustion (M flag of "0"), which is a function of the intake air quantity QA and engine speed NE, shown by FIG. 12B is the map for lean-fuel combustion (M flag of "1"), and shown by FIG. 12C is the map for rich-fuel combustion (M flag of "2").

Following the fetching of an ignition timing ESA(M) relevant to the combustion mode, the sequence proceeds to step S520. The step S520 determines whether or not the intake air response QARESP is 1.0, i.e., whether the combustion mode has been changed and the intake air quantity QA is amid switching. If it is not amid mode switching (QARESP=1.0), the sequence proceeds to step S570 to set the base ignition timing ESABASE to be the ignition timing ESA(M) of the combustion mode which has been fetched in step S510, and the sequence proceeds to step S560. Otherwise, if it is amid switching (QARESP×1.0), the sequence proceeds to the process from step S530.

The process from step S530 computes the base ignition timing ESABASE in accordance with the intake air response QARESP amid mode switching. The step S530 determines whether or not the combustion mode has changed by checking the equality of the combustion mode flag M to the previous flag value. If it is immediately after the switching of combustion mode, ESABASE(M(i−1)) is set to be the base ignition timing ESABASE before the switching of combustion mode, and the sequence proceeds to step S550. If the step S530 makes a negative determination, the sequence skips step S540 and proceeds to step S550. The step S550 computes the base ignition timing during the transition of combustion mode by the following formula.

$$ESABASE=ESABASE(M(i-1))+QARESP \times ESA(M)-ESABSE(M(i-1))$$

The term ESA(M)−ESABASE(M(i−1)) represents the difference of base ignition timings before and after the combustion mode switching. Multiplying the response QARESP to this variation value gives the modification value relevant to the previous base ignition timing. In consequence, the base ignition timing which accords with the intake air quantity QA in the transition of combustion mode switching can be computed accurately.

Next, the computation process of ignition timing ESA which takes place in step S560 will be explained. The step S560 computes by the following formula the ignition timing ESA which accords with the base ignition timing ESABASE of the combustion mode computed in step S570 and the intake air quantity amid switching computed in step S550.

$$ESA=ESABSE+FESA$$

The term FESA is the conventionally known modification factor for the warming-up modification or transition modification.

The combustion mode switching control based on this embodiment will be explained in connection with the timing chart of FIGS. 13A–13G. The figure shows the case where the combustion mode is switched from stoichiometric combustion to lean-fuel combustion (M flag turned from "0" to "1").

Figure 13A:
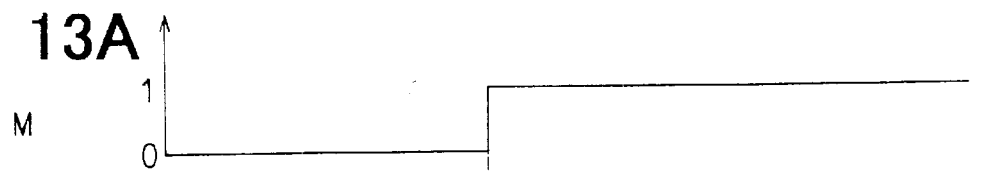
FIGS. 13A–13G are timing charts showing the combustion mode switching control based on the first embodiment of invention.
Figure 13B:
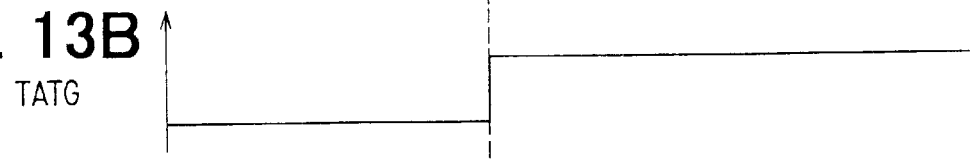
Figure 13C:
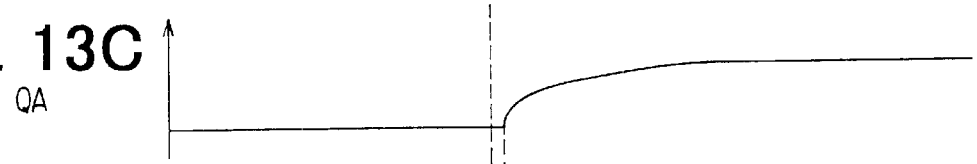

When the flag M is turned from "0" to "1" at time point t1 as shown by FIG. 13A, a step-wise target throttle opening TATG is set in accordance with the combustion mode as shown by FIG. 13B. Since the intake air flow into the cylinders of engine has a time lag from the established throttle opening, the intake air quantity QA begins to increase at time point t2 after a while following the time point t1 as shown by FIG. 13C. Consequently, the intake air response QARESP varies from 0 to 1.0 as shown by FIG. 13D.

The following explains the control operation of this embodiment shown by the solid line in contrast to a comparative operation shown by the dash-dot line. In the comparative operation, the fuel injection quantity TAU and ignition timing ESA are changed to the post-switching target values immediately after the combustion mode is switched at time point t1 as shown by FIGS. 13E and 13F. However, the intake air quantity QA has a time lag from the established target throttle opening TATG as shown by FIG. 13C, and therefore the fuel injection quantity TAU and ignition timing ESA are not appropriate for the transitional intake air quantity QA, causing the engine speed NE (torque) to sag as shown by FIG. 13G.

Figure 13D:
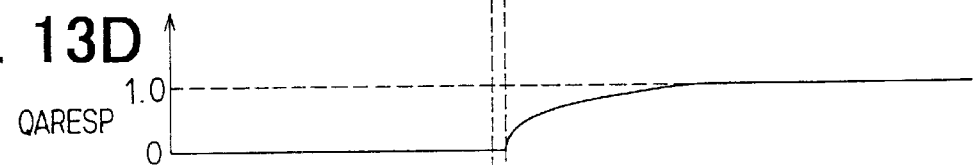
Figure 13E:
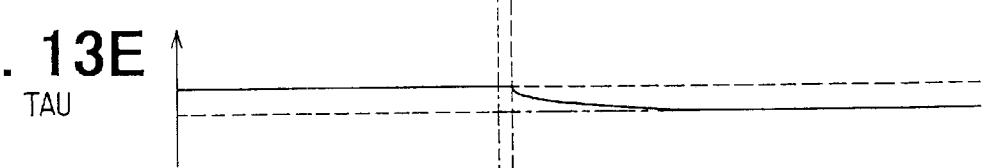
Figure 13F:
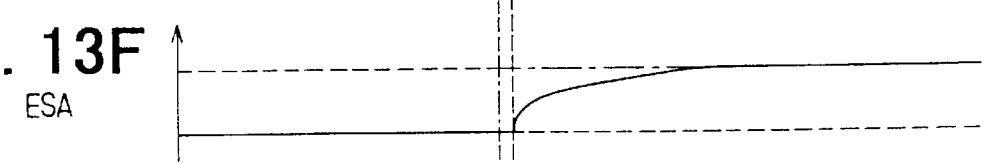
Figure 13G:
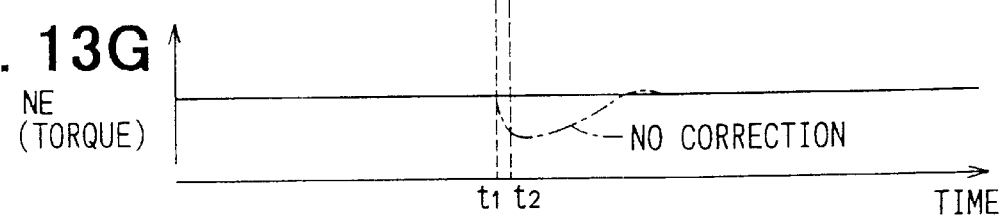

Whereas, according to this embodiment of invention, the fuel injection quantity TAU and ignition timing ESA are set as shown by FIGS. 13E and 13F to follow the variation of intake air quantity which is slowest in terms of response QARESP as shown by FIG. 13D. This scheme enables to control the fuel injection quantity and ignition timing to accord accurately with the intake air quantity QA in the transition of combustion mode, thereby preventing the sag of engine speed NE (torque) as shown by FIG. 13G. Accordingly, the absence of a large ignition timing retardation prevents the torque variation, and consequently the disturbance of combustion can be prevented.

Figure 30:
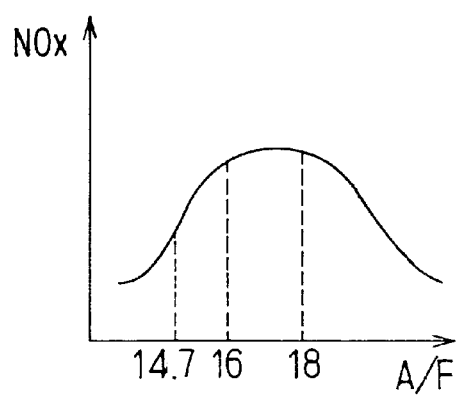
FIG. 30 is a characteristic graph showing the amount of NOx emission in connection with the air-fuel ratio.

In this embodiment, it is desirable to make the air-fuel ratio leaner than 18 at which a large amount of NOx is produced as shown in FIG. 30. In this case, the quick switching of combustion mode enables the quick passage of the air-fuel ratio zone (16–18) where a large amount of NOx is produced, and the further reduction of NOx can be achieved. For example, the emission control system, which is designed to reduce and release NOx in the NOx catalyst 14 by feeding rich combustion gas when the quantity of absorbed and stored NOx has reached a certain amount, can reduce the amount of NOx produced at the transition of combustion mode, and it can alleviate the decrease of lean-fuel combustion time and alleviate the aggravation of fuel efficiency.

Figure 7:
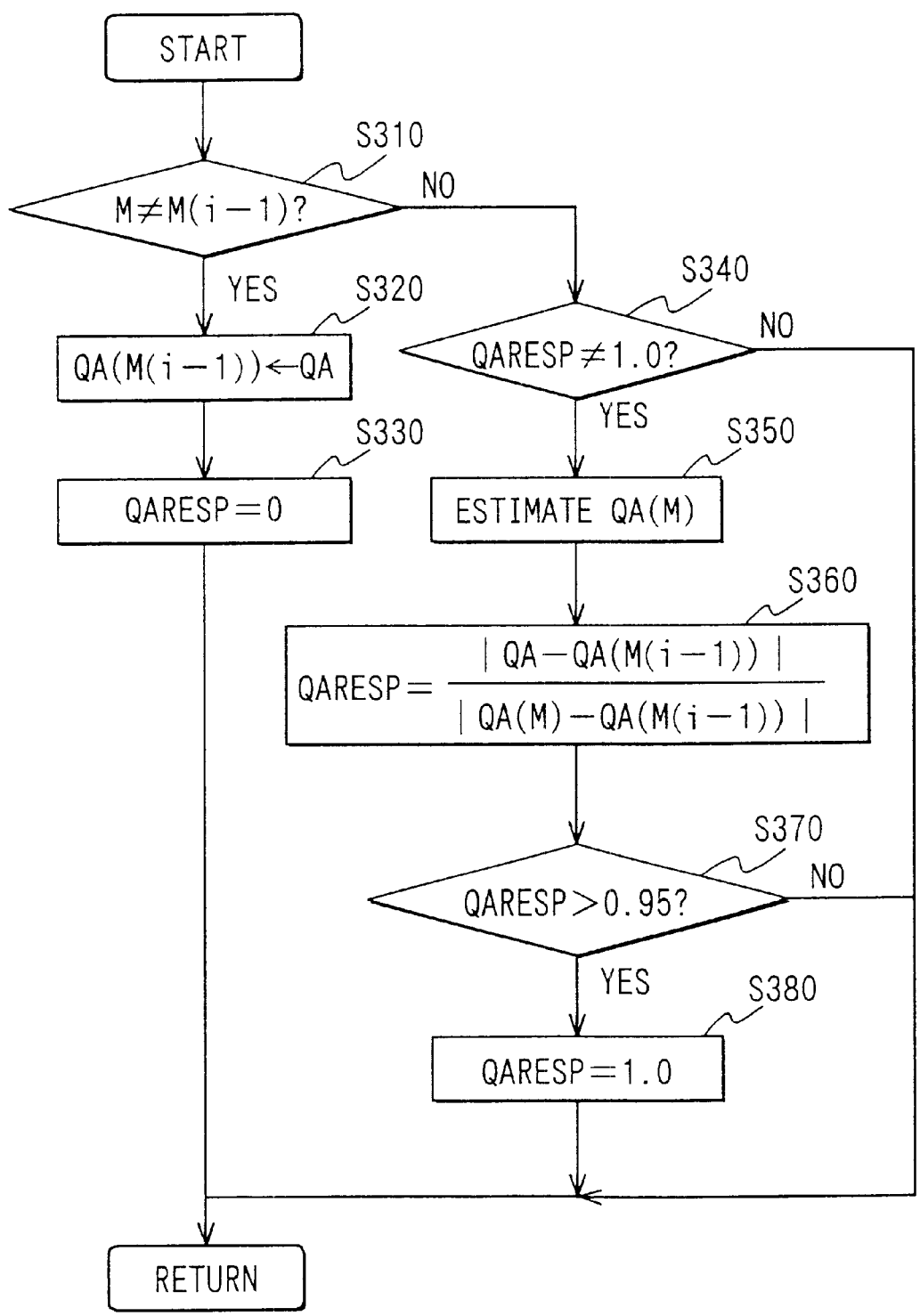
FIG. 7 is a flowchart showing the computation of intake air response.
Figure 8:
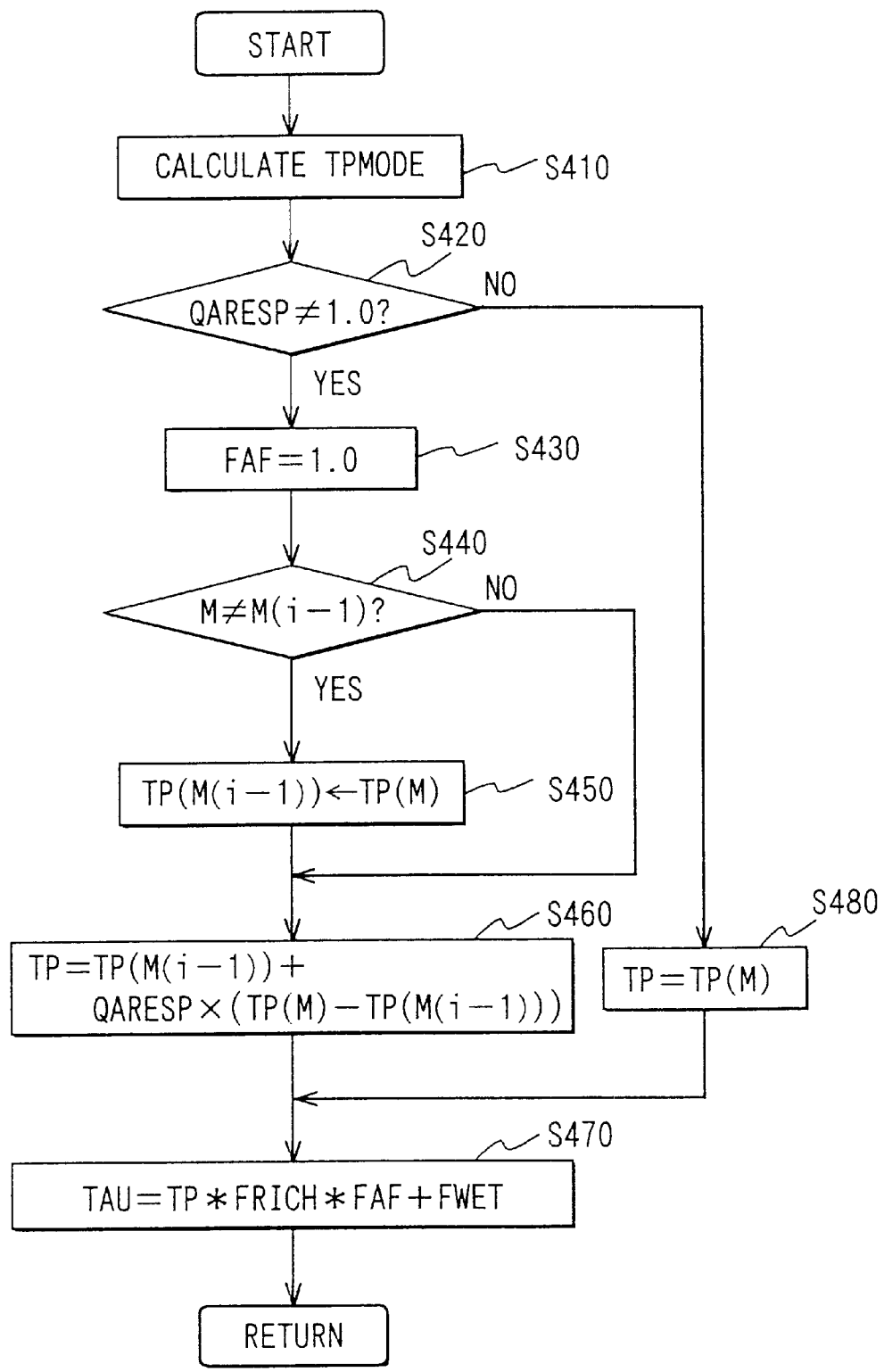
FIG. 8 is a flowchart showing the computation of fuel injection quantity based on the first embodiment of invention.
Figure 11:
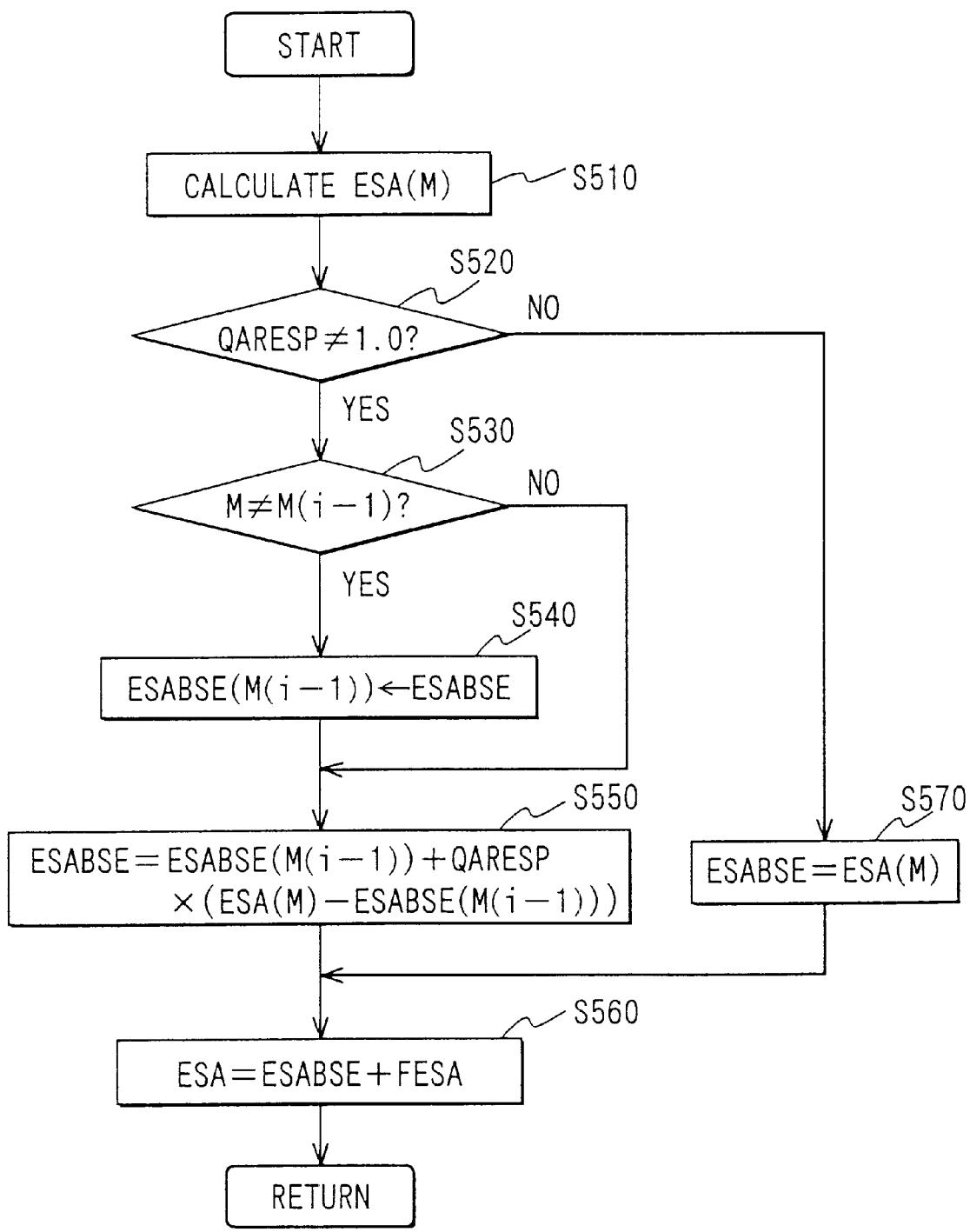
FIG. 11 is a flowchart showing the computation of ignition timing based on the first embodiment of invention.

In this embodiment, a throttle valve control means is accomplished functionally by the flowchart of FIG. 4, an intake air response computation means is accomplished by the flowchart of FIG. 7, a modification means is accomplished by the flowcharts of FIG. 8 and FIG. 11, and an intake air inference means is accomplished by means of inferring the intake air quantity based on the throttle opening detected by the throttle sensor 23 and the engine speed NE.

Second Embodiment

Figure 28:
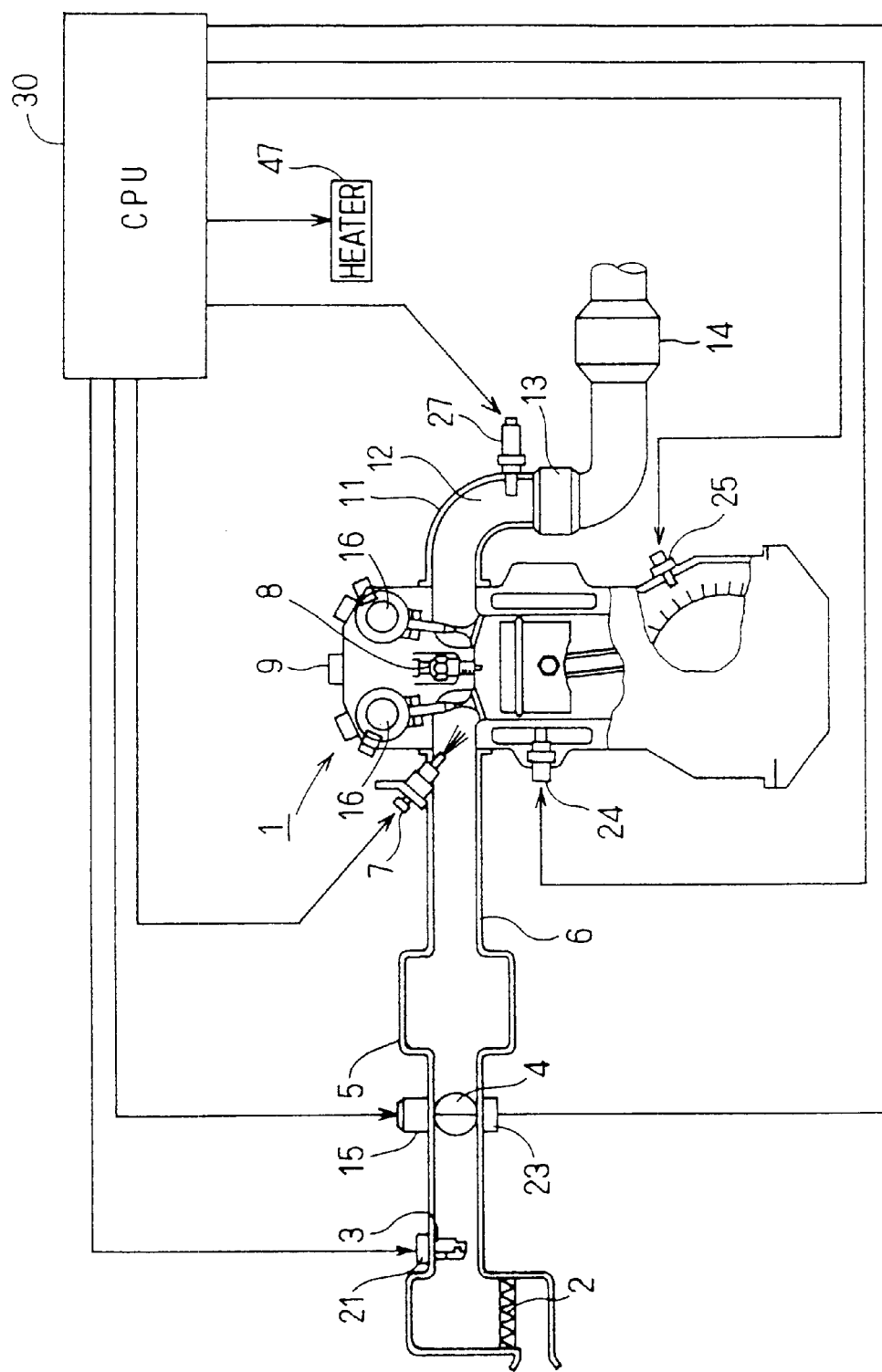
FIG. 28 is a schematic diagram showing the second embodiment of this invention.

An engine control system of the second embodiment is shown in FIG. 28. In the second embodiment, the engine 1 has variable valve timing actuators 16 and 16 on an intake camshaft and an exhaust camshaft for varying valve timings.

In the first embodiment, at the switching of combustion mode, the intake air quantity in the transition of combustion mode is inferred and the response of intake air quantity is computed based on the inferred value and the target values before and after the combustion mode switching. Based on the intake air response, the ignition timing and fuel injection quantity are controlled thereby to reduce the torque variation.

The apparatus for controlling the engine of the second embodiment, which is a derivative of the first embodiment, is additionally provided with a variable valve timing (VVT) control system. The embodiment reduces the torque shock even if the target value of VVT is switched, so that the variation of engine speed NE can be alleviated. The VVT control system is employed in this embodiment to control the amount of exhaust gas recirculation (internal EGR quantity). The VVT control may be implemented to increase the internal EGR quantity by the advance control of exhaust VVT for the control of internal EGR quantity, or by increasing the overlap value of the intake VVT and exhaust VVT thereby to increase the internal EGR quantity, for example, depending on the operational state.

The principle of control of this embodiment will be explained. When the VVT-based EGR control is implemented, if the internal EGR quantity increases relative to the case of combustion solely on the intake air, the output torque decreases. Therefore, if the control values of the fuel injection quantity and ignition timing are set solely in accordance with the intake air quantity as in the case of the first embodiment at the switching of combustion mode, the engine does not produce a torque in need, causing the engine speed NE to sag. This affair is caused by the difference of the response of internal EGR quantity from the response of intake air quantity at the mode switching.

Particularly, in case the switching from lean-fuel combustion to stoichiometric combustion, and vice versa, are controlled based solely on the ignition timing retardation, as in the case of the prior art system, the ignition retardation can merely reduce the output torque and cannot increase the output torque. Accordingly, in case the torque error decreases, the ignition retardation cannot compensate the decreased output torque, and the engine speed NE cannot be prevented from sagging.

The following explanation premises that lean-fuel combustion has an increased intake air quantity and decreased EGR quantity relative to stoichiometric combustion, and that the fuel injection quantity and ignition timing are set in accordance with the intake air response as in the case of the first embodiment.

Figure 14A:
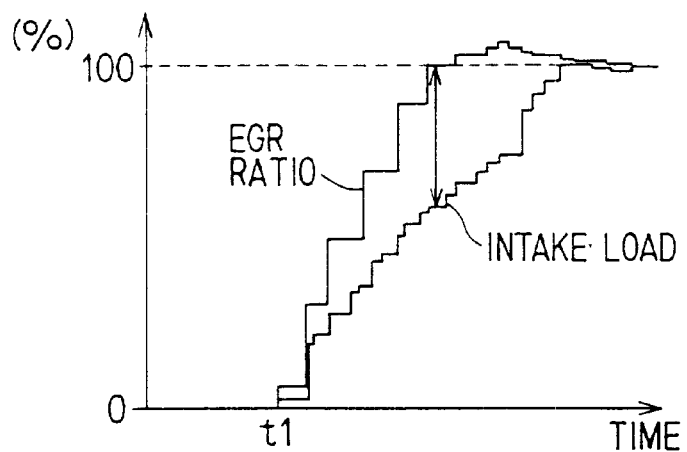
FIG. 14A is a graph showing the intake air response and exhaust gas recirculation response at the switching from rich-fuel combustion to stoichiometric combustion.
Figure 14B:
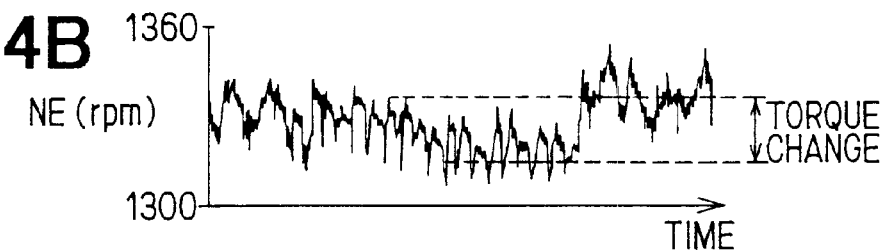
FIG. 14B is a graph showing the variation of engine speed NE at the switching from lean-fuel combustion to stoichiometric combustion.

The following explains briefly in connection with FIGS. 14A and 14B the relation of response between the intake air quantity and VVT-based internal EGR quantity at the switching from lean-fuel combustion to stoichiometric combustion. On the graphs, the response indicates the rate of variation toward the post-switching target value, the intake load indicates the rate of variation of the intake air quantity, and the EGR indicates the rate of variation of exhaust gas quantity by the VVT. As shown by the graph of FIG. 14A, when the combustion mode is switched at time point t1, the intake air quantity QA varies slower than the EGR quantity, resulting in a large difference of their responses.

Due to the emergence of this response difference, the EGR quantity responds quicker than the intake air quantity, resulting in an increased proportion of EGR quantity relative to the intake air quantity at the switching from lean-fuel combustion to stoichiometric combustion. A resulting decrease of output torque causes the engine speed NE to sag as shown in FIG. 14B. On this account, the VVT-based internal EGR control based solely on the ignition timing retardation of the first embodiment cannot correct this torque reduction.

At the switching from stoichiometric combustion to lean-fuel combustion, the EGR quantity has a decreased proportion relative to the intake air quantity, resulting in an increased output torque. On this account, the increased output torque causes the engine speed NE to rise at switching from lean-fuel combustion to stoichiometric combustion.

The second embodiment is designed to compute the fuel injection quantity and ignition timing based on the faster response among intake air and internal EGR for the switching control from lean-fuel combustion to stoichiometric combustion, so that the torque variation caused by the difference of these responses is manipulated to the torque increase side. The excessive output torque resulting from the difference between the intake air response and the internal EGR response can be reduced by the ignition timing retardation.

For the switching control from stoichiometric combustion to lean-fuel combustion, the fuel injection quantity and ignition timing are computed based on the slower response among intake air and internal EGR, and the torque variation caused by the difference of these responses can be manipulated to the torque increase side. The torque variation at the switching of combustion mode can be reduced by the ignition timing retardation.

By manipulating the torque variation caused by the difference of response between intake air and internal EGR always to the torque increase side based on the foregoing principle, it is possible to compensate the increased output torque by the ignition timing retardation. The base fuel injection quantity and base ignition timing are set based on one of the responses as in the case of the first embodiment, and a large torque shock does not arise. Since the arising torque shock is solely caused by the difference in response, the reduction of torque shock necessitates only a small ignition timing retardation, and the aggravation of combustion can be alleviated.

The combustion mode switching control of this embodiment, which is performed based on the foregoing principle, will be explained in detail with reference to the drawings. In this embodiment, the internal EGR control is based on the exhaust VVT advance control.

Target VVT Advance Value Computation Routine

The computation process of VVT advance value will be explained in connection with the flowchart of FIG. 15. This program routine is initiated at every timing of combustion, i.e., it is initiated at every 180° CA of a 4-cylinder, 4-cycle engine.

Figure 16A:
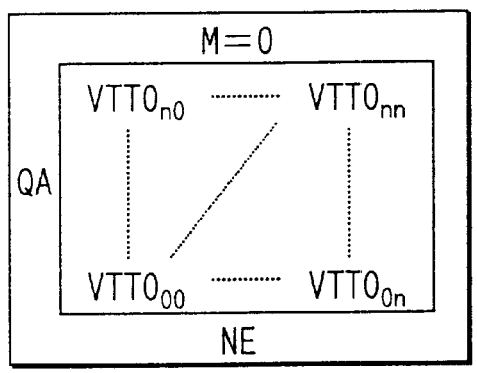
FIGS. 16A, 16B and 16C are diagrams of the maps for the setting of VVT advance angles in response to the engine speed NE and intake air quantity QA for individual combustion modes.
Figure 16B:
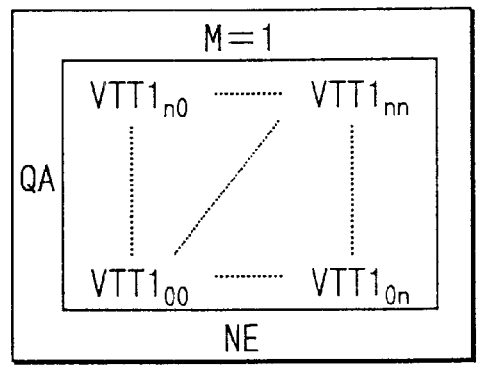
Figure 16C:
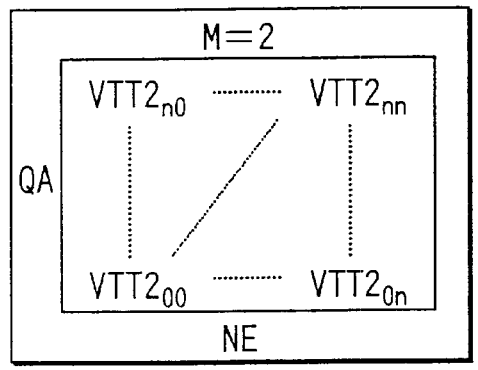

In step S600, a map of target VVT advance value (target angle) VTT which is a function of the engine speed NE and intake air quantity QA for each M flag value is accessed. Shown by FIG. 16A is the map of target angle VTT for stoichiometric combustion (M flag of "0") as a function of the engine speed NE and intake air quantity QA, and shown by FIGS. 16B and 16c are the maps for the M flags of "1" and "2", respectively.

A map is selected depending on the combustion mode, and a target angle VTT is fetched from the map in accordance with the intake air quantity QA and engine speed NE. The angle VTT is controlled to maintain the target angle VTT on a feedback basis thereby to determine the EGR quantity which matches with the operational state.

EGR Response Computation Routine

Next, the computation of the rate of variation of EGR quantity based on VVT i.e., the response of EGR quantity, at the switching of combustion mode will be explained in connection with the flowchart of FIG. 17. This program routine is initiated at every timing of combustion, i.e., it is initiated at every 180° CA of a 4-cylinder, 4-cycle engine.

The routine is initiated, and the first step S710 determines whether or not the combustion mode has changed by checking the equality of the flag M and flag M(i−1). On detecting a change of flag value, the sequence proceeds to the process of steps S720 and S730 to indicate the change of combustion mode. This process is for the initial setting which takes place immediately after the switching of combustion mode.

Figure 15:
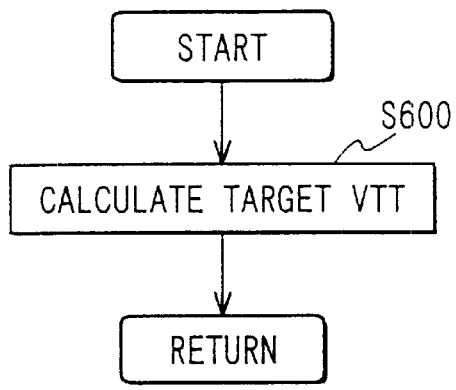
FIG. 15 is a flowchart showing the computation of target VVT advance angle based on a second embodiment of this invention.

The step S720 sets the VTA(M(i−1)) to be the target angle VTT which has been computed in the step S600 of FIG. 15. The next step S730 sets the response EGRESP of VVT-based internal EGR to be 0, and the routine terminates. The step S710 makes negative determinations continuously and the process from step S740 takes place repeatedly until the next event of mode switching. The step S740 determines whether or not the response EGRESP of VVT-based internal EGR is 1.0. The EGRESP of 1.0 indicates the end of transition of combustion mode, and the routine terminates in response to a negative determination of the step S740.

Otherwise, if the step S740 detects the response EGRESP of VVT-based internal EGR unequal to 1.0, indicative of the engine operation amid the combustion mode switching, the sequence proceeds to step S750. The step S750 computes the VVT-based EGR response EGRESP by the following formula.

$$EGRESP=|VTA-VTA(M(i-1))|/|VTT-VTA(M(i-1))|$$

In the formula, the denominator represents the difference of the VVT advance angle $VTA(M(i-1))$ before mode switching from the post-switching target angle VTT. The numerator computes the difference of the immediate VVT advance angle VTA from the VVT advance angle $VTA(M(i-1))$ of the previous combustion mode thereby to evaluate the response of internal EGR quantity in the transition of combustion mode. Following the computation of the internal EGR quantity response by the step S750, the sequence proceeds to step S760. The step S760 determines whether or not the computed EGR quantity response EGRESP is close to 100%, specifically whether or not the response EGRESP is greater than 0.95 for example. If this condition is met, as indicated by a positive determination of the step S760, the sequence proceeds to step S770 to set the EGR quantity response EGRESP to be 1.0, and the routine terminates. Otherwise, if the response EGRESP computed by step S760 is 0.95 or less, the routine terminates immediately.

Following the computation of the response EGRESP1 of VVT-based internal EGR quantity and the response QARESP of intake air quantity (shown by the flowchart of FIG. 7 for the first embodiment), the base fuel injection quantity TP and base ignition timing ESABSE are controlled in accordance with the two computed responses as follows.

RESP Computation Routine

Figure 24:
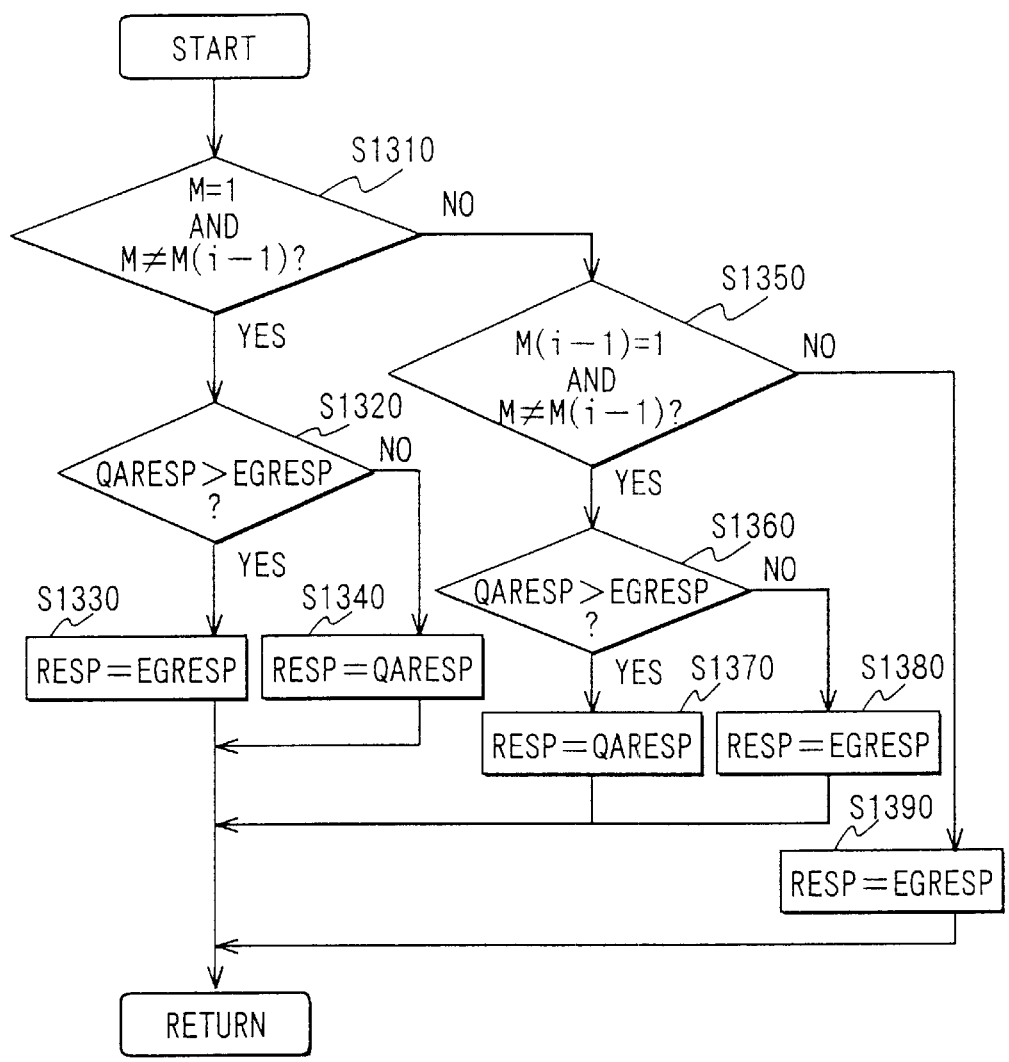
FIG. 24 is a flowchart showing the computation of response RESP.

First, the computation of response RESP which is needed at the setting of the fuel injection quantity TAU and ignition timing ESA will be explained in connection with the flowchart of FIG. 24. This program routine is the subroutine of step S1060 shown in FIG. 22.

The first step S1310 determines as to which way has the combustion mode changed. On detecting the switching from stoichiometric or rich-fuel combustion to lean-fuel combustion, i.e., M=1 and M×M(i−1), the sequence proceeds to step S1320. The step S1320 determines as to which response is faster among the EGRESP1 of internal EGR quantity and the QARESP of intake air quantity.

Due to the switching of combustion mode to lean-fuel combustion in this case, the internal EGR response EGRESP1 is faster than the intake air response QARESP, causing the EGR quantity to increase less than the intake air quantity QA, resulting in an increased output torque. Accordingly, if it is intended to choose the torque variation on the increase side, control is preferably based on the response of intake air quantity. However, the experiment conducted by the inventors of the present invention has revealed that the intake air response QARESP is faster than the EGR response EGRESP1 in some cases even at the switching from rich-fuel combustion to lean-fuel combustion. In consideration of this fact, this embodiment is designed to select a controlling parameter of the slower response so that the output torque increases at the switching from stoichiometric or rich-fuel combustion to lean-fuel combustion.

Specifically, if the step S1320 determines that the intake air response QARESP is the faster, the sequence proceeds to step S1330 to set the internal EGR response EGRESP1 to the response RESP for modifying the fuel injection quantity TAU and ignition timing ESA, and the routine terminates. Otherwise, if the step S1320 determines that the intake air response QARESP is the slower, the sequence proceeds to step S1340 to set the intake air response QARESP to the response RESP, and the routine terminates.

In this manner, when the combustion mode is switched from stoichiometric or rich-fuel combustion to lean-fuel combustion, the response RESP is set to be the faster of the intake air response QARESP or EGR response EGRESP1.

Next, the process from step S1350 which follows a negative determination of the step S1310 will be explained. The step S1350 determines whether or not the switching of combustion mode is from lean-fuel combustion to stoichiometric or rich-fuel combustion based on as to whether or not conditions M=1 and M×M(i−1) are met. If these conditions are met, i.e., at the switching from lean-fuel combustion to rich-fuel or stoichiometric combustion, the sequence proceeds to step S1360.

The step S1360 determines as to which response is faster among the QARESP of intake air quantity and the EGRESP1 of VVT-based internal EGR quantity. On detecting the intake air response QARESP to be the faster in this step, the sequence proceeds to step S1370 to set the RESP to be the intake air response QARESP. Otherwise, in case the VVT-based EGR response EGRESP1 is the faster, the sequence proceeds to step S1390 to set the RESP to be the VVT-based EGR response EGRESP1.Following the selection of response in this manner, the routine terminates.

In case the step S1350 makes a negative determination, i.e., switching from stoichiometric combustion to rich-fuel combustion, and vice versa, the sequence proceeds to step S1390 to set the RESP to be the VVT-based EGR response EGRESP1, and the routine terminates. Even at the switching from stoichiometric combustion to rich-fuel combustion, and vice versa, the response may be selected such that the torque shock caused by the difference of response at the switching of combustion mode is on the torque increase side.

Following the selection of response relevant to the combustion mode switching, the ignition timing ESA and fuel injection quantity TAU are computed in accordance with the selected response RESP as follows.

Fuel Injection Quantity Computation Routine

Figure 22:
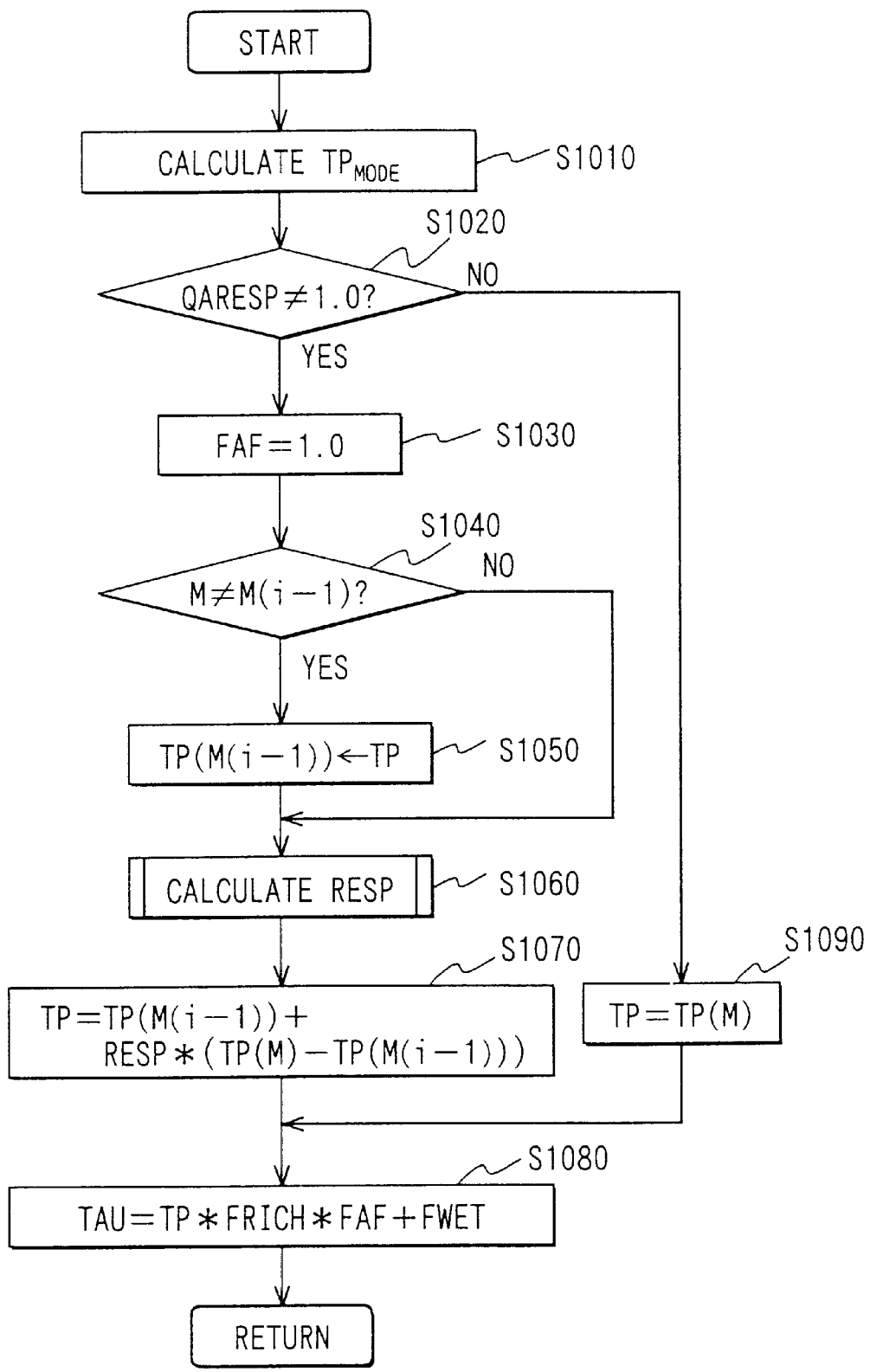
FIG. 22 is a flowchart showing the computation of fuel injection quantity based on the response RESP.

FIG. 22 shows by flowchart the computation of fuel injection quantity. The first step S1010 computes the fuel injection quantity TP(M) from the engine speed NE, intake air quantity QA and flag M. The fuel injection quantity TP(M) is the base fuel injection quantity of each combustion mode. The specific computation process is similar to step S410 on the flowchart of FIG. 8 for the first embodiment.

The next step S1020 determines whether or not the combustion mode is amid switching, i.e., whether or not the intake air response QARESP is 1.0. On detecting the intake air response QARESP to be 1.0, the sequence proceeds to step S1090 to set the base fuel injection quantity TP to be the fuel injection quantity TP(M) which has been computed in step S1010, and the sequence proceeds to step S1080.

Otherwise, on detecting the intake air response to be between 0 and 1.0, the sequence proceeds to the process from step S1030. The process from step S1030 computes the base fuel injection quantity TP in the transition of combustion mode switching. Initially, the step S1030 sets the air-fuel ratio modification factor FAF to be 1.0 in order to suspend the feedback control of air-fuel ratio, and the sequence proceeds to step S1040. The step S1040 determines the equality of the flag values M and M(i−1) to determine as to whether or not it is immediately after the switching of combustion mode. If the flag values are not equal, i.e., it is immediately after mode switching, the following step S1050 initializes the TP(M(i−1)) to be the previous base fuel injection quantity TP, and the sequence proceeds to step S1060.

Otherwise, if the flag values M and M(i−1) are equal, i.e., it is amid the combustion mode switching, the sequence skips the step S1050 of initial setting and proceeds to step S1060. The step S1060 fetches the response RESP which has been selected as explained above, and modifies the base fuel injection quantity TP in accordance with the response RESP by the following formula.

$$TP=TP(M(i-1))+RESP \times (TP(M)-TP(M(i-1)))$$

This formula computes the modification value by multiplying the response RESP to the base injection quantities before and after the combustion mode switching and adds the resulting value to the base injection quantity TP(M(i−1)) before switching, thereby evaluating the base injection quantity TP amid the combustion mode switching which is relevant to the response RESP.

The subsequent step S1080 computes by the following formula the fuel injection quantity TAU in accordance with the base injection quantity TP which has been set in the steps S1070 and S1090.

$$TAU=TP \times FRICH \times FAF \times FWET$$

In the formula, the term TP is the base injection quantity which has been set in the steps S1070 and S1090, the term FRICH is the modification factor such as the cold-start or warming-up modification factor, and the term FWET is a modification factor for the transitional operation state.

Ignition Timing Computation Routine

Figure 23:
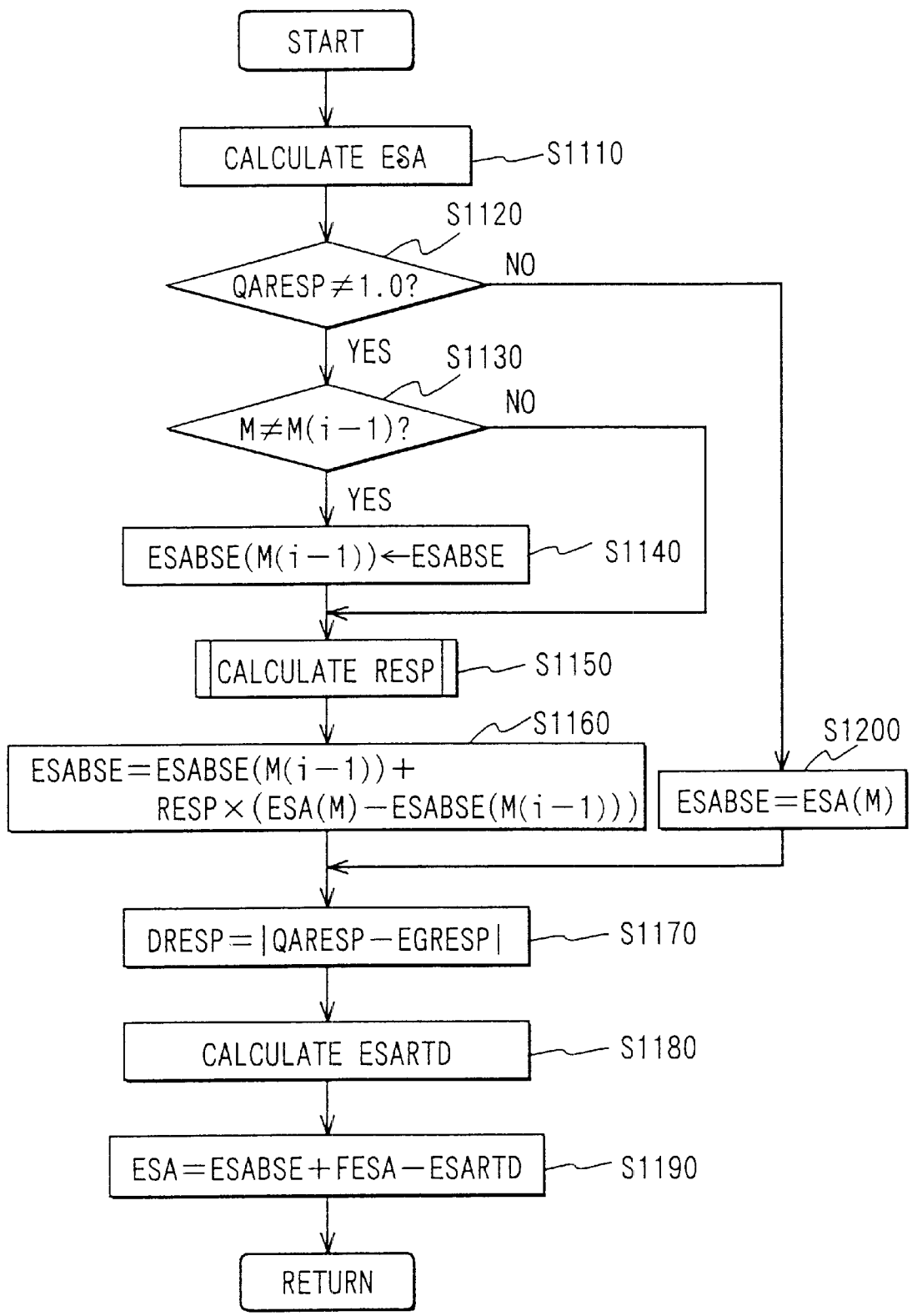
FIG. 23 is a flowchart showing the computation of ignition timing based on the response RESP.

FIG. 23 shows by flowchart the computation of ignition timing. The first step S1110 computes the base ignition timing ESA(M) from the engine speed NE, intake air quantity QA and flag M. The base ignition timing ESA(M) is the base ignition timing of each combustion mode. The specific computation process is similar to the step S410 on the flowchart of FIG. 8 for the first embodiment.

The next step S1120 determines whether or not the combustion mode is amid switching based on as to whether or not the intake air response QARESP is 1.0. On detecting the intake air response QARESP to be 1.0, the sequence proceeds to step S1200 to set the base ignition timing ESABSE to be the base ignition timing ESA(M) which has been computed in the step S1110.

Otherwise, on detecting the intake air response to be between 0 and 1.0, the sequence proceeds to the process from step S1130. The process from step S1130 computes the base ignition timing ESABSE amid the combustion mode switching. Initially, the step S1130 determines the equality of the flag values M and M(i−1) to determine as to whether or not it is immediately after the switching of combustion mode. If the flag values are not equal, i.e., it is immediately after mode switching, the following step S1140 initializes the ESABSE(M(i−1)) to be the previous base ignition timing ESABSE, and the sequence proceeds to step S1150.

Otherwise, if the flag values M and M(i−1) are equal, i.e., it is amid the combustion mode switching, the sequence skips the step S1140 of initial setting and proceeds to step S1150. The step S1150 fetches the response RESP which has been selected previously. The next step S1160 modifies the base fuel injection quantity TP in accordance with the response RESP by the following formula.

$$ESABSE=ESABSE(M(i-1))+RESP \times (ESA(M))-ESABSE(M(i-1))$$

This formula computes the modification value by multiplying the response RESP to the base ignition timings before and after the combustion mode switching and adds the resulting value to the base ignition timing ESABSE(M(i−1)) before switching, thereby evaluating the base ignition timing ESABSE amid the combustion mode switching which is relevant to the response RESP.

In this manner, the base ignition timing ESABSE is set by the steps S1200 and S1160. In the foregoing explanation, the fuel injection quantity and ignition timing are set in accordance with the response RESP. The purpose of this setting is to manipulate the torque variation caused by the difference of response between the internal EGR and intake air quantity to be always on the torque increase side. On this account, in order to reduce the torque caused by the difference of response, the process of steps S1170 and S1180 sets ignition timing retardation value for torque reduction in accordance with the difference between the EGR response EGRESP1 and intake air response QARESP.

Initially, the step S1170 computes the response difference DRESP between the intake air quantity and EGR quantity by the following formula.

$$DRESP=|QARESP-EGRESP1|$$

Figure 25:
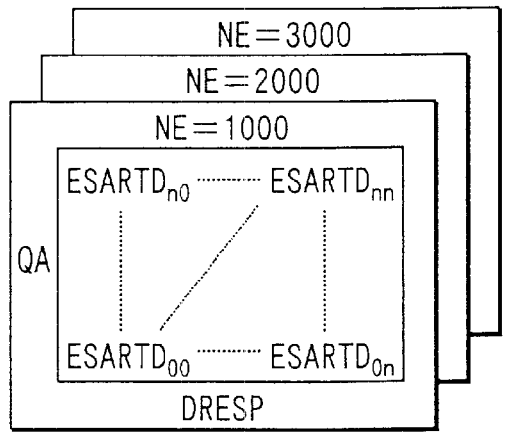
FIG. 25 is a diagram of the map for the setting of ignition timing retardation in accordance with the difference of responses and the intake air quantity QA for individual operation zones.

This formula computes the response difference DRESP, which is the cause of torque shock, from the response QARESP of intake air quantity and response EGRESP1 of EGR quantity. Step S1180 computes the ignition retardation modification value ESARTD. Specifically, it fetches an ignition retardation modification value from maps shown in FIG. 25 in accordance with the response difference DRESP, intake air quantity QA and engine speed NE, for example. The maps of FIG. 25 are assigned to several zones of engine speed NE. Each map has such characteristics that the ignition retardation modification value ESARTD is proportional to the response difference DRESP and also proportional to the intake air quantity QA and engine speed NE.

Step S1190 computes the ignition timing ESA in accordance with the determined base ignition timing ESABSE and ignition retardation modification value ESARTD by the following formula.

$$ESA=ESABSE+FESA-ESARTD$$

In this formula, the term ESABSE is the base ignition timing ESABSE which has been set by one of the steps S1160 and S1200, the term FESA is the cold-start or warming-up modification factor, and the term ESARTD is the ignition retardation modification value which has been computed in the step S1180.

Next, the combustion mode switching control performed by this embodiment will be explained in connection with the timing chart of FIG. 26. This timing chart shows the inventive scheme by the solid line in contrast to the prior art case shown by the dash-dot line where the fuel injection quantity TAU and ignition timing ESA are brought to the post-switching target values immediately at the switching of combustion mode.

FIG. 26A Shows the value of flag M, and indicates the switching of combustion mode from stoichiometric combustion (M=1) to lean-fuel combustion (M=0) at time point t1. In response to this mode switching, the target throttle opening TATG is switched in step-wise fashion to control the intake air quantity QA as shown by FIG. 26B. The target VVT angle VTT is also switched by stepping as shown by FIG. 26D. Due to the combustion mode switching from lean-fuel combustion to stoichiometric combustion, the throttle opening is set to the opening side in order to reduce the intake air quantity, and the target VVT angle VTT is set to be smaller than the advance angle for stoichiometric combustion in order to reduce the EGR quantity.

Based on the setting of the target throttle opening TATG and target VVT angle VTT in this manner, the intake air quantity QA follows the target throttle opening TATG with a time lag as shown by FIG. 26C. Specifically, the intake air quantity QA begins to increase at time point t2. The actual VVT angle VTA also follows the target angle VTT with the time lag as shown by FIG. 26E. Shown by FIGS. 26F and 26G are the response QARESP of intake air quantity and the response EGRESP1 of internal EGR quantity which follow the variation of the VVT target angle and throttle opening. The response EGRESP1 of VVT-based internal EGR quantity is faster as compared with the response QARESP of intake air quantity.

According to the prior art, the fuel injection quantity TAU and ignition timing ESA are switched immediately to the post-switching target values after the switching of combustion mode as shown by FIGS. 26H and 26I by the dash-dot lines. In consequence, the intake air quantity which is slower in response is lacking after the fuel injection quantity TAU and ignition timing ESA have been switched to the target values of lean-fuel combustion, resulting in a sag of engine speed NE (torque) as shown by FIG. 26L by the dash-dot line.

Whereas, according to this embodiment of invention, the slower of the intake air response QARESP or the EGR response EGRESP1 is selected and set to the response RESP. The ignition timing ESA and fuel injection quantity TAU are modified based on the response RESP. In consequence, the torque difference caused by the difference between the EGR response EGRESP1 and intake air response QARESP arises on the torque increase side, and the torque shock can further be reduced based on the ignition retardation control. The ignition timing retardation value ESARTD is set as shown by FIG. 26J by a map which is based on the above-mentioned response difference.

Based on the foregoing combustion mode switching control, the torque shock which lasts until time point t3 when the intake air quantity QA reaches the post-switching target value is reduced, and smooth combustion mode switching can be performed.

Next, the combustion mode switching control operations from lean-fuel combustion to rich-fuel combustion based on this embodiment and the prior art will be explained in connection with the timing chart of FIG. 27. According to the prior art, the fuel injection quantity TAU and ignition timing ESA are switched immediately to the post-switching target values at the switching of combustion mode as shown by the dash-dot line, in contrast to the inventive control operation shown by the solid lines.

Initially, the combustion mode is switched from lean-fuel combustion (M=1) to stoichiometric combustion (M=0) at time point t1 as shown in FIG. 27A. In response to this transition, the target intake air quantity and VVT target angle are set, i.e., the target throttle opening TATG is set in step-wise fashion toward the closing side as shown in FIG. 27B. This is due to the need of a large amount of intake air for lean-fuel combustion. At the same time, the target VVT angle VTT for the control of EGR quantity is set in step-wise fashion as shown in FIG. 27D.

In response to these target values, the intake air quantity QA begins to increase at time point t2 as shown in FIG. 27C, and the actual VVT angle VTA begins to advance at time point t2 as shown in FIG. 27E.

According to the prior art, when the combustion mode has switched, the fuel injection quantity TAU and base ignition timing ESA are switched immediately to the post-switching target values as shown in FIGS. 27H and 27I. In the case of switching from lean-fuel combustion to stoichiometric combustion, where the intake air quantity is decreased gradually, the ignition timing ESA and fuel injection quantity TAU immediately after mode switching have control values of stoichiometric combustion in a state of excessive intake air quantity, resulting in an increased engine speed NE (torque) as shown in FIG. 27L. A large ignition timing retardation is needed for the reduction of this torque shock, and it disturbs the combustion.

Whereas, according to this embodiment of invention, the intake air response QARESP and EGR response EGRESP1 as shown in FIGS. 27F and 27G are computed and the faster of the two responses is set to the response RESP. The fuel injection quantity TAU and base ignition timing ESA are modified based on this response RESP as shown in FIGS. 27H and 27I by the solid lines. Based on the selection for the response RESP such that the torque increases, the torque shock caused by the difference of the two responses can be alleviated by the ignition retardation control.

The ignition timing retardation value is set by using a map or the like in accordance with the difference of the two responses as shown in FIG. 27J. The fuel injection quantity TAU and base ignition timing ESA are modified, and the ignition timing retardation value is set in accordance with the response difference as shown in FIG. 27K. Based on this control, the torque shock which lasts until time point t3 when the intake air quantity QA reaches the post-switching target value can be alleviated.

As described above, this embodiment is designed to select a VVT-based EGR response and intake air response and modifies the fuel injection quantity and ignition timing based on one of the responses. In consequence, the torque shock arising at the switching of combustion mode is alleviated, and the torque shock caused by the difference of the EGR response and intake air response can be manipulated to the torque increase side. By the rendition of ignition retardation control to the increased torque, the torque shock can be reduced. By varying the throttle opening and VVT by stepping, it is possible to perform the combustion mode switching quickly. Particularly, in the case of the lean-fuel combustion control at the air-fuel ratio of the stratified charge combustion, the switching to stoichiometric combustion or rich-fuel combustion passes the air-fuel ratio zone in which NOx is liable to arise. The quick passage of the air-fuel ratio zone of NOx emission based on this embodiment can reduce the amount of NOx emission.

Figure 17:
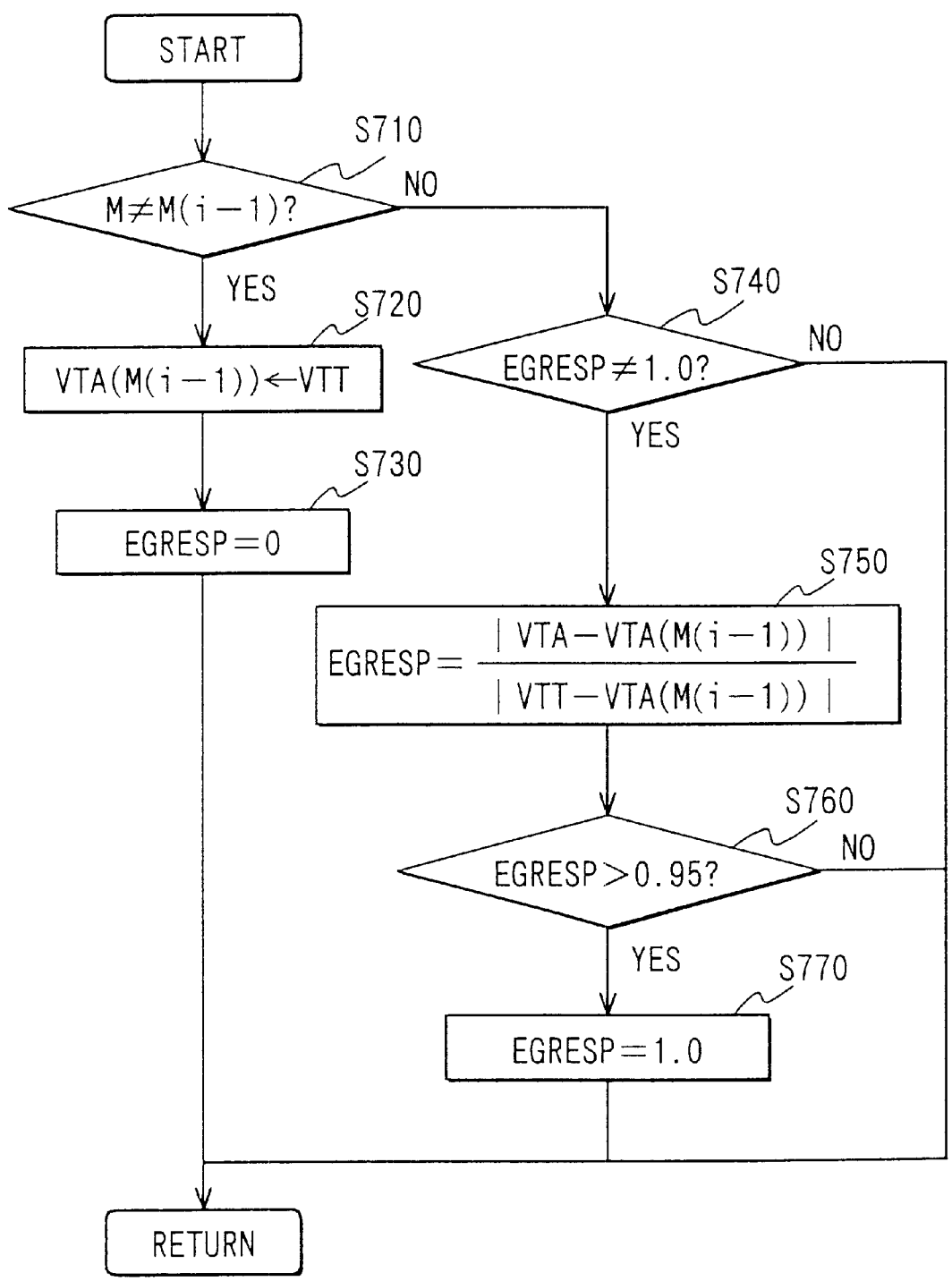
FIG. 17 is a flowchart showing the computation of the response of internal EGR quantity based on the second embodiment of invention.

In this embodiment, intake air quantity response computation means is accomplished functionally by the flowchart of FIG. 7, exhaust gas quantity control means is accomplished by the flowchart of FIG. 15, exhaust gas quantity response computation means is accomplished by the flowchart of FIG. 17, modification means is accomplished by the steps from S1110 to S1160 of the flowcharts of FIG. 22 and FIG. 23, and ignition timing retardation means is accomplished by the steps from S1170 to S1190 of the flowchart FIG. 23.

This embodiment is designed to compute the intake air response and EGR response and select the faster response or slower response depending on the combustion mode thereby to manipulate the torque shock caused by the response difference between intake air and EGR always to the torque increase side. However, intake air and EGR have virtually the same speed of response at the switching of combustion mode except for the early stage of switching as shown in FIG. 14. Therefore, a practical manner of fuel injection control and ignition timing control can be based on the EGR response at the mode switching from lean-fuel combustion to stoichiometric or rich-fuel combustion, and can be based on the intake air response at the mode switching from rich-fuel or stoichiometric combustion to lean-fuel combustion.

Specifically, map values before and after the combustion mode switching are interpolated and a value is selected based on the designated response. For example, the fuel injection quantity Q(L) for lean-fuel combustion and the fuel injection quantity Q(S) for stoichiometric combustion are treated by the linear interpolation, and the fuel injection quantity at an EGR response of 50% is evaluated to be $(Q(S)-Q(L)) \times 0.5 + Q(L)$.

The ignition timing may be modified to the retarding side during the transition of combustion mode. The retardation value can be set in accordance with the difference of response between intake air and EGR. Although the output torque is generally liable to increase at the switching of combustion mode, the torque increase can be alleviated by the retardation modification of ignition timing, and the aggravation of drivability can be alleviated.

Third Embodiment

The response of intake air quantity and the response of VVT-based internal EGR quantity have been described in the explanation of the second embodiment. The third embodiment of this invention uses an EGR system as a means of recirculating exhaust gas into the cylinders of engine. The following explains the control of the state amid the switching of combustion mode by application of the external EGR quantity control based on the EGR system.

Figure 29:
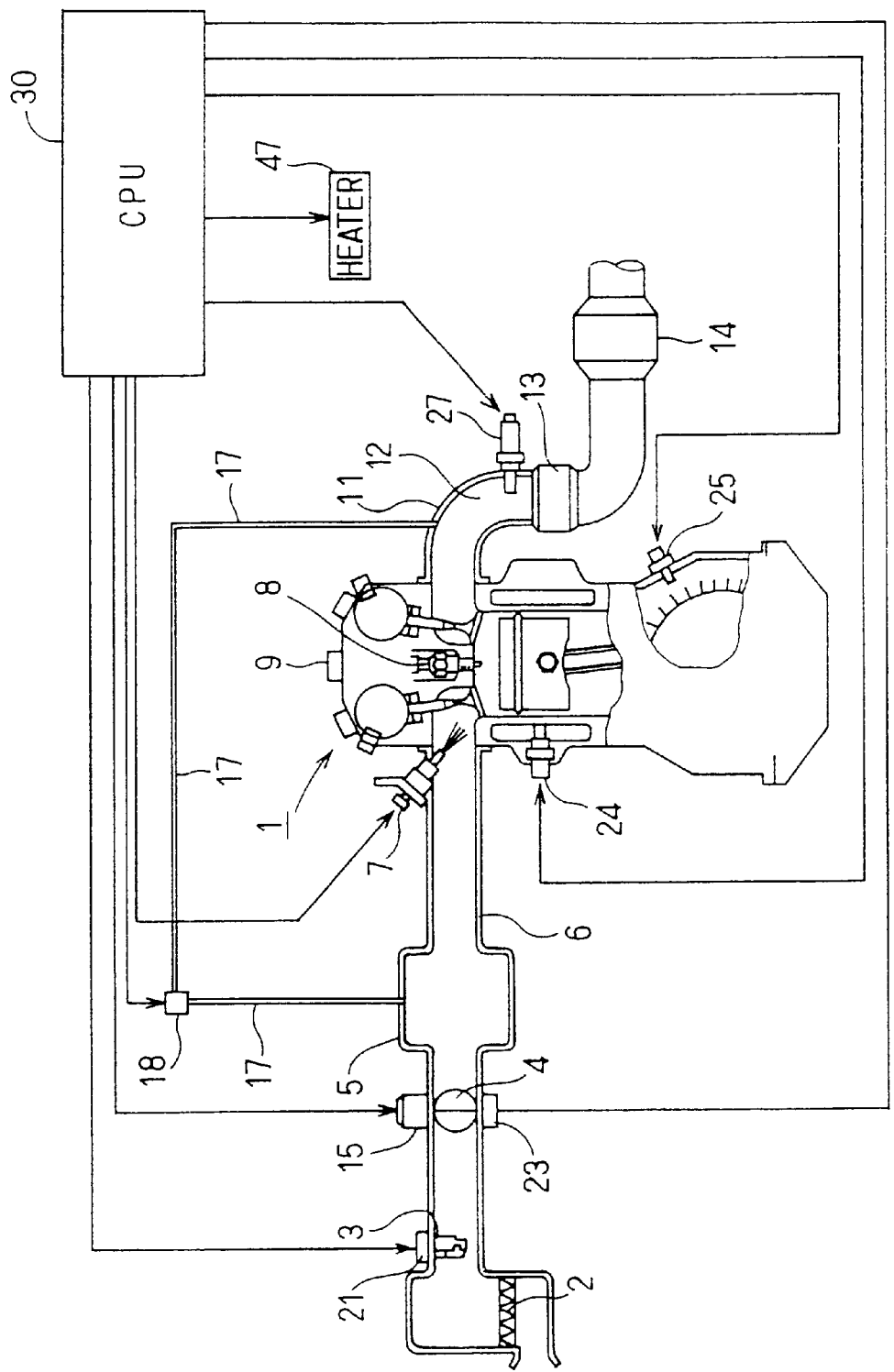
FIG. 29 is a schematic diagram showing the third embodiment of this invention.

First, the EGR system will be explained briefly in connection with the schematic diagram of FIG. 29. The same portions as those of FIG. 1 will not be explained here. The EGR system includes an EGR path 17 for conducting exhaust gas from the exhaust pipe 12 to the intake manifold. The amount of EGR admitted into the intake manifold is controlled by adjusting the opening of a control valve 15. In the EGR system of this kind, the response of exhaust gas quantity based on the EGR system is slower than the response of intake air quantity. However, this response relation varies depending on the operational state immediately after the combustion mode switching. The following explains only affairs distinct from the second embodiment.

Target EGR Valve Opening Computation Routine

First, the computation of the EGR-based external EGR quantity will be explained in connection with the flowchart of FIG. 18. The EGR system includes an EGR valve 15 for controlling the EGR quantity, and it can control the external EGR quantity as intended in accordance with the intake manifold pressure and EGR valve opening.

Figure 19A:
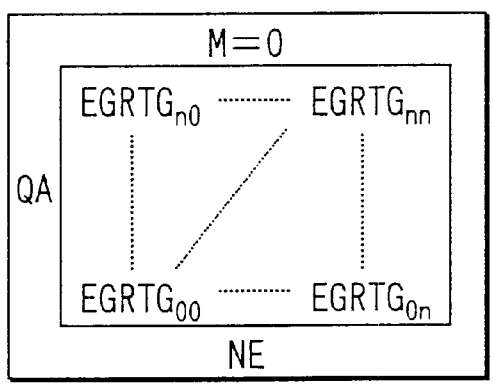
FIGS. 19A, 19B and 19C are diagrams of the maps for the setting of target EGR valve openings in response to the engine speed NE and intake air quantity QA for individual combustion modes.
Figure 19B:
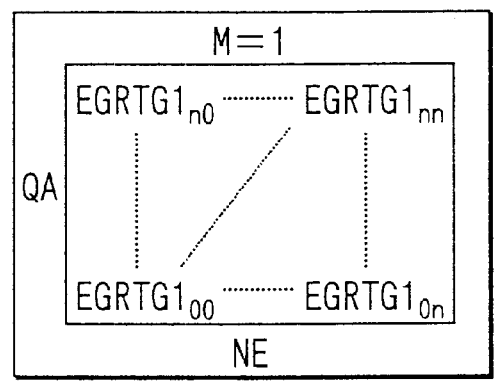
Figure 19C:
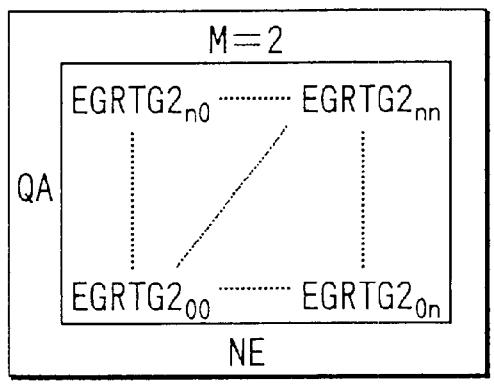

The first step S800 computes the opening of the EGR valve 15 which matches with the operational state of each combustion mode. FIG. 19A shows a map of target EGR valve opening which is dependent on the engine speed NE and intake air quantity QA for stoichiometric combustion. FIGS. 19B and 19C show maps of target EGR valve opening for lean-fuel combustion and rich-fuel combustion, respectively. A target EGR valve opening which is dependent on the combustion mode and operational state is computed based on these maps, and the routine terminates.

The EGR system sets the target EGR valve opening and controls the EGR quantity which accords with the operational state.

EGR Quantity Response Computation Routine

Figure 20:
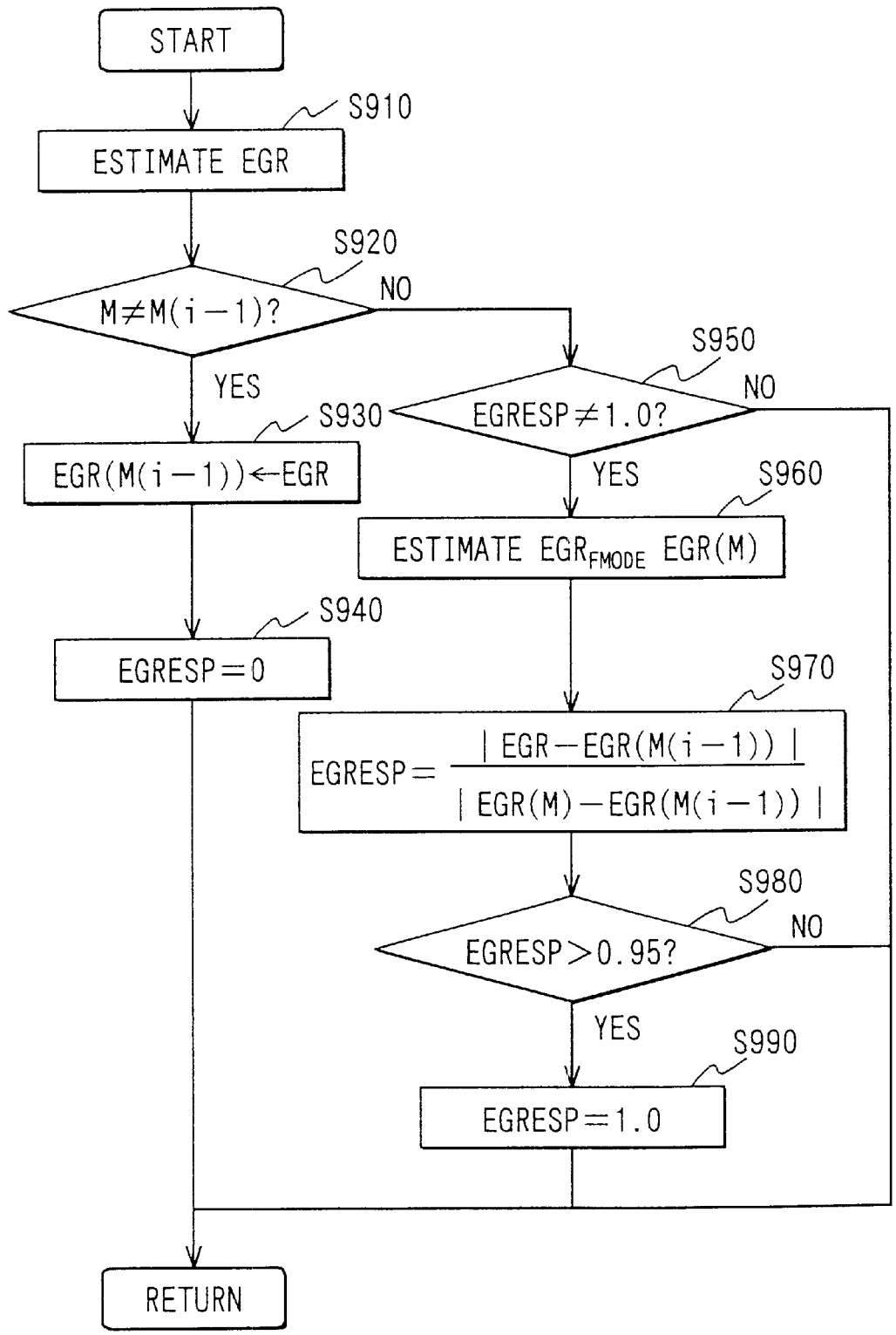
FIG. 20 is a flowchart showing the computation of external EGR response based on the third embodiment of invention.

Next, the computation of EGR quantity response EGRESP2 by the EGR system at the time of combustion mode switching will be explained in connection with the flowchart of FIG. 20.

Figure 21:
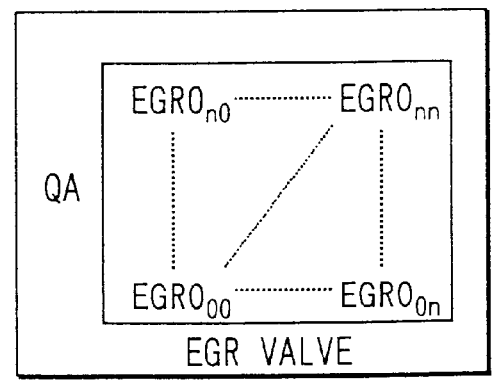
FIG. 21 is a diagram of the map used for the inference of EGR quantity from the EGR valve opening and intake air quantity based on the third embodiment of invention.

The first step S910 infers the EGR quantity EGR based on the EGR valve opening and intake air quantity QA as shown in FIG. 21. Alternatively, the intake manifold pressure is computed from the intake air quantity QA, and the EGR quantity EGR is inferred based on the intake manifold pressure and EGR valve opening. Step S920 determines whether or not the combustion mode has changed by checking the equality of the combustion mode flags M and M(i−1). On detecting a change of combustion mode as indicated by a positive determination of the step S920, the sequence proceeds to the process of steps S930 and S940 to implement the initial setting for the computation of external EGR quantity response.

The step S930 sets the EGR quantity EGR, which has been computed in step S910, to the EGR (of the previous combustion mode), and the sequence proceeds to step S940. The step S940 sets the external EGR quantity response EGRRESP2 by the EGR system to be 0, and the routine terminates. This initial setting process takes place only immediately after the combustion mode has been switched, and during the later transition of switching, the step S920 makes a negative determination, causing the routine to proceed to step S950. The step S950 determines whether or not the EGR quantity response EGRRESP2 is 1.0. The EGR quantity response EGRRESP2 of 1.0 signifies the end of combustion mode switching control, and following a negative determination of the step S950, the routine terminates.

Otherwise, if the step S950 determines the EGRRESP2 to be not 1.0, indicative of the state in the transition of combustion mode switching, the sequence proceeds to the process from step S960 to compute the external EGR quantity response EGRRESP2. The step S960 infers the target EGR quantity EGR(M) based on the target EGR valve opening EGRTG which has been set in the process shown by the flowchart of FIG. 18 and the exhaust gas intake air quantity after the combustion mode switching. The sequence proceeds to step S970 to compute the EGR quantity response EGRRESP2 of EGR system by the following formula.

$$EGRESP = |EGR - EGR(M(i-1))| / |EGR(M) - EGR(M(i-1))|$$

In the formula, the denominator represents the EGR quantity which varies by mode switching, and the numerator is the amount of inferred immediate EGR variation. Following the computation of the EGR response EGRESP2, the sequence proceeds to step S980. The step S980 determines whether or not the computed external EGRRESP2 is close to 100%, specifically whether or not the EGRRESP2 is greater than 0.95 for example. If this condition is met, indicative of the end of combustion mode switching, the sequence proceeds to step S990 to set the EGR response EGRRESP2 to be 1.0, and the routine terminates. Otherwise, if the condition is not met, indicative of the state in the transition of combustion mode switching, the external response EGR-RESP2 computed in step S970 is left unchanged, and the routine terminates.

Following the computation of EGRRESP2 of the EGR system in this manner, the response RESP computation routine, which has been explained in connection with FIG. 24 for the second embodiment, selects an intake air response QARESP and EGR response EGRESP2 in accordance with the combustion mode switching and set to the response RESP.

Based on the modification of base fuel injection quantity TP and base ignition timing ESABSE in accordance with the established response RESP, the torque shock during the transition of combustion mode switching can be reduced. The torque shock caused by the difference between the EGR response EGRRESP2 and the intake air response QARESP is manipulated always to the torque increase side. In consequence, the torque shock can be alleviated by ignition retardation, and smooth switching of combustion mode can be performed as in the case of the second embodiment.

Even in the case of the lean-fuel combustion control at the air-fuel ratio leaner than 18 as in the case of the stratified charge combustion, in which the mode switching to rich-fuel combustion or lean-fuel combustion passes the air-fuel ratio zone of a large amount of NOx creation, the implementation of quick combustion mode switching can alleviate the creation of a large amount of NOx.

Figure 18:
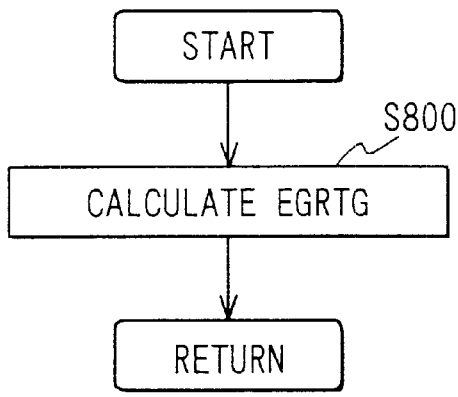
FIG. 18 is a flowchart showing the setting of target EGR valve opening based on a third embodiment of this invention.

Exhaust gas control means of this embodiment is accomplished functionally by the flowchart of FIG. 18.

This embodiment is designed to compute the intake air response and external EGR response and select the faster response or slower response depending on the combustion mode thereby to manipulate the torque shock caused by the response difference between intake air and external EGR always to the torque increase side. However, intake air and EGR have virtually the same speed of response at the switching of combustion mode except for the early stage of switching as shown in FIG. 14. Therefore, a practical manner of fuel injection control and ignition timing control can be based on the intake air response at the mode switching from lean-fuel combustion to stoichiometric or rich-fuel combustion, and can be based on the external EGR response at the mode switching from rich-fuel or stoichiometric combustion to lean-fuel combustion. Specifically, the same manner as described for the second embodiment can be used. In regard to the ignition timing control, the torque increase may be suppressed by the same manner as described for the second embodiment.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. An apparatus for controlling an engine which operates in a plurality of combustion modes and controls the quantity of intake air by throttle valve control means in accordance with each combustion mode, the apparatus comprising:

throttle control means which varies the throttle opening from a throttle opening before mode switching to a target throttle opening after mode switching in step-wise fashion at the switching of combustion mode;

intake air response computation means which computes the response of intake air quantity based on the variation of opening of the throttle valve during the transition of combustion mode switching; and modification means which modifies the quantity of fuel injection and the ignition timing in accordance with the response of intake air quantity computed by the intake air response computation means.

2. The apparatus for controlling the engine according to claim 1 further comprising:

intake air quantity inference means which infers the quantity of intake air during the transition of combustion mode switching, wherein the intake air response computation means computes the response of intake air quantity based on the intake air quantity which is derived from the throttle valve opening before the combustion mode switching, the intake air quantity which is derived from the throttle valve opening after the combustion mode switching set by a target throttle opening setting means, and the inferred value of intake air quantity provided by the intake air quantity inference means.

3. The apparatus for controlling the engine according to claim 1, wherein the modification means modifies the quantity of fuel injection and the ignition timing based on the response of intake air quantity and the fuel injection quantities and ignition timings before and after the combustion mode switching.

4. The apparatus for controlling the engine according to claim 1 further comprising:

exhaust gas recirculation quantity control means which recirculates exhaust gas to the engine depending on the combustion mode; and exhaust gas recirculation response computation means which computes the response of exhaust gas recirculation based on the immediate exhaust gas recirculation quantity and the exhaust gas recirculation quantities before and after the combustion mode switching achieved by the exhaust gas recirculation control means, wherein the modification means modifies the quantity of fuel injection and the ignition timing based on the response of intake air quantity computed by the intake air response computation means and the response of exhaust gas recirculation quantity computed by the exhaust gas recirculation response computation means.

5. The apparatus for controlling the engine according to claim 4, wherein the exhaust gas recirculation quantity control means implements a step-wise switching to a post-switching target exhaust gas recirculation quantity in response to a request of combustion mode switching.

6. The apparatus for controlling the engine according to claim 4 further comprising:

ignition timing retardation means for retarding the ignition timing thereby to suppress the output torque, wherein the modification means sets the quantity of fuel injection and the ignition timing based on one of the response of intake air quantity and response of exhaust gas recirculation at the switching of combustion mode so that the output torque increases, and wherein the ignition timing retardation means sets the ignition timing retardation value based on the difference between the response of intake air quantity and the response of exhaust gas recirculation.

7. The apparatus for controlling the engine according to claim 6, wherein the setting of fuel injection quantity and ignition timing is implemented by modifying a base fuel injection quantity and a base ignition timing.

8. The apparatus for controlling the engine according to claim 4 further comprising:
a variable valve timing mechanism which sets arbitrarily the opening/closing timing of the intake valve and/or exhaust valve of the engine,
wherein the exhaust gas recirculation quantity control means recirculates exhaust gas to the engine by operating on the variable valve timing mechanism to set arbitrarily the opening/closing timing of the intake valve and/or exhaust valve.

9. The apparatus for controlling the engine according to claim 4 further comprising:
an exhaust gas recirculation path which recirculates exhaust gas from the exhaust path to the intake path of the engine; and
an exhaust gas recirculation valve which is disposed on the exhaust gas recirculation path and adapted to set arbitrarily the cross-sectional area of the exhaust gas recirculation path,
wherein the exhaust gas recirculation quantity control means controls the quantity of exhaust gas recirculation by means of the exhaust gas recirculation valve.

10. The apparatus for controlling the engine according to claim 8, wherein in the case of combustion mode switching from lean-fuel combustion to stoichiometric or rich-fuel combustion, the modification means modifies the intake air quantity and ignition timing based on the faster of the response of exhaust gas recirculation computed by the exhaust gas recirculation response computation means and the response of intake air quantity computed by the intake air response computation means, and modifies the retardation of the modified ignition timing based on the difference between the response of exhaust gas recirculation computed by the exhaust gas recirculation response computation means and the response of intake air quantity computed by the intake air response computation means.

11. The apparatus for controlling the engine according to claim 8, wherein in the case of combustion mode switching from rich-fuel or stoichiometric combustion to lean-fuel combustion, the modification means computes the intake air quantity and ignition timing based on the slower of the response of exhaust gas recirculation computed by the exhaust gas recirculation response computation means and the response of intake air quantity computed by the intake air response computation means, and modifies the retardation of the modified ignition timing based on the difference between the response of exhaust gas recirculation computed by the exhaust gas recirculation response computation means and the response of intake air quantity computed by the intake air response computation means.

12. The apparatus for controlling the engine according to claim 8, wherein in the case of combustion mode switching, the modification means modifies the fuel injection quantity and ignition timing based on whichever response that causes a torque increase among the response of exhaust gas recirculation computed by the exhaust gas recirculation response computation means and the response of intake air quantity computed by the intake air response computation means, and modifies the retardation of the modified ignition timing based on the difference between the response of exhaust gas recirculation computed by the exhaust gas recirculation response computation means and the response of intake air quantity computed by the intake air response computation means.

13. The apparatus for controlling the engine according to claim 8, wherein in the case of combustion mode switching from lean-fuel combustion to stoichiometric or rich-fuel combustion, the modification means computes the fuel injection quantity and ignition timing based on the response of exhaust gas recirculation computed by the exhaust gas recirculation response computation means, and modifies the retardation of the modified ignition timing based on the difference between the response of exhaust gas recirculation computed by the exhaust gas recirculation response computation means and the response of intake air quantity computed by the intake air response computation means.

14. The apparatus for controlling the engine according to claim 8, wherein in the case of combustion mode switching from rich-fuel or stoichiometric combustion to lean-fuel combustion, the modification means modifies the fuel injection quantity and ignition timing based on the response of intake air quantity computed by the intake air response computation means, and modifies the retardation of the modified ignition timing based on the difference between the response of exhaust gas recirculation computed by the exhaust gas recirculation response computation means and the response of intake air quantity computed by the intake air response computation means.

* * * * *